US010092979B2

(12) United States Patent
Suzuki et al.

(10) Patent No.: US 10,092,979 B2
(45) Date of Patent: Oct. 9, 2018

(54) LASER IRRADIATION APPARATUS

(71) Applicant: GIGAPHOTON INC., Tochigi (JP)

(72) Inventors: Akiyoshi Suzuki, Tochigi (JP); Minoru Taniyama, Tochigi (JP); Osamu Wakabayashi, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 15/962,664

(22) Filed: Apr. 25, 2018

(65) Prior Publication Data

US 2018/0236602 A1 Aug. 23, 2018

Related U.S. Application Data

(63) Continuation of application No. PCT/JP2015/086161, filed on Dec. 25, 2015.

(51) Int. Cl.
*B23K 26/06* (2014.01)
*B23K 26/073* (2006.01)
(Continued)

(52) U.S. Cl.
CPC .............. *B23K 26/10* (2013.01); *G02B 26/08* (2013.01)

(58) Field of Classification Search
CPC ................ B23K 26/10; B23K 26/0736; B23K 26/0821; G02B 26/08; G02B 26/101;
(Continued)

(56) References Cited

U.S. PATENT DOCUMENTS 5,103,074 A * 4/1992 Watanabe .......... B23K 26/0736
219/121.68
6,014,401 A 1/2000 Godard et al.
(Continued)

FOREIGN PATENT DOCUMENTS

JP H11-033767 A 2/1999
JP H11-511295 A 9/1999
(Continued)

OTHER PUBLICATIONS

International Search Report issued in corresponding International Application No. PCT/JP2015/086161; dated Mar. 22, 2016.
(Continued)

*Primary Examiner* — Eric Stapleton
(74) *Attorney, Agent, or Firm* — Studebaker & Brackett PC

(57) ABSTRACT

A laser irradiation apparatus may include: an irradiation head section including first and second irradiation heads each configured to perform laser light irradiation on a workpiece; a laser unit section including first and second laser units configured to respectively output first laser light and second laser light; a beam delivery section provided in an optical path between the laser unit section and the irradiation head section, and configured to perform switching of optical paths between optical paths of the first laser light and the second laser light to cause the first or second laser light to enter the first or second irradiation head; a first beam property varying section provided in an optical path between the first laser unit and the irradiation head section; and a second beam property varying section provided in an optical path between the second laser unit and the irradiation head section.

9 Claims, 24 Drawing Sheets

(51) Int. Cl.
*G02B 26/08* (2006.01)
*B23K 26/10* (2006.01)

(58) Field of Classification Search
CPC .... G01S 7/4811; G01S 7/4817; G01S 17/936; C21D 8/1294
USPC .......... 219/121.79, 121.68, 121.75, 121.8; 359/210.1, 209.1; 250/234
See application file for complete search history.

(56) References Cited

U.S. PATENT DOCUMENTS

| | | | |
|---|---|---|---|
| 6,127,647 | A | 10/2000 | Matsuo et al. |
| 7,826,117 | B2* | 11/2010 | Yamada ................ G01S 7/4811 250/234 |
| 7,864,304 | B2* | 1/2011 | Yamada ................ G01S 3/784 356/4.01 |
| 8,000,181 | B2* | 8/2011 | Yamada ................ G01S 7/4812 356/3.09 |
| 8,599,892 | B2 | 12/2013 | Senda |
| 8,872,058 | B2* | 10/2014 | Sano ................ B23K 26/0066 219/121.6 |
| 9,464,611 | B2* | 10/2016 | Sugihashi ............ F02M 55/025 |
| 2003/0214571 | A1* | 11/2003 | Ishikawa ............ B23K 26/0604 347/255 |
| 2007/0195393 | A1* | 8/2007 | Yamada ................ G01S 7/4811 359/196.1 |
| 2007/0262063 | A1* | 11/2007 | Sano ................ B23K 26/0066 219/121.85 |
| 2008/0240178 | A1* | 10/2008 | Denney ................ B23K 26/032 372/24 |
| 2009/0059766 | A1* | 3/2009 | Yamada ................ G01S 7/4812 369/112.01 |
| 2009/0201488 | A1* | 8/2009 | Yamada ................ G01S 3/784 356/4.01 |
| 2010/0055490 | A1* | 3/2010 | Sugihashi ................ C21D 7/00 428/596 |
| 2010/0188722 | A1* | 7/2010 | Yamada ................ G01S 7/4811 359/196.1 |
| 2011/0005493 | A1* | 1/2011 | Hirano ................ B23K 20/227 123/456 |
| 2011/0041874 | A1* | 2/2011 | Shindou ............ H01L 21/0209 134/1.3 |
| 2016/0313564 | A1 | 10/2016 | Wakabayashi et al. |

FOREIGN PATENT DOCUMENTS

| | | |
|---|---|---|
| JP | 2002-176006 A | 6/2002 |
| JP | 2002-176007 A | 6/2002 |
| JP | 2005-294493 A | 10/2005 |
| JP | 2008-281705 A | 11/2008 |
| JP | 2012-227353 A | 11/2012 |
| JP | 2012-243818 A | 12/2012 |
| WO | 2015/151177 A1 | 10/2015 |

OTHER PUBLICATIONS

International Preliminary Report on Patentability issued in corresponding International Application No. PCT/JP2015/086161; dated Jun. 26, 2018.

* cited by examiner

LASER IRRADIATION APPARATUS

CROSS REFERENCE TO RELATED APPLICATIONS

The present application is a continuation application of International Application No. PCT/JP2015/086161 filed on Dec. 25, 2015. The content of the application is incorporated herein by reference in its entirety.

BACKGROUND

1. Technical Field

The present disclosure relates to a laser irradiation apparatus.

2. Related Art

A laser annealing apparatus reforms an amorphous silicon film deposited on a substrate into a polysilicon film by irradiating the amorphous silicon film with pulsed laser light, and this pulsed laser light is output from a laser system such as an excimer laser and has a wavelength in an ultraviolet range. Reforming an amorphous silicon film into a polysilicon film makes it possible to fabricate a thin-film transistor (TFT). Such a TFT is used in a relatively large liquid-crystal display.

For example, reference is made to Japanese Unexamined Patent Application Publication No. 2005-294493, Japanese Unexamined Patent Application Publication No. 2012-227353, Japanese Unexamined Patent Application Publication (Published Japanese Translation of PCT Application) No. JP11-511295, Japanese Unexamined Patent Application Publication No. 2002-176006, Japanese Unexamined Patent Application Publication No. 2002-176007, Japanese Unexamined Patent Application Publication No. 2012-243818, and International Publication No. 2015/151177.

SUMMARY

A laser irradiation apparatus according to one aspect of the present disclosure may include an irradiation head section, a laser unit section, a beam delivery section, a first beam property varying section, and a second beam property varying section. The irradiation head section may include a first irradiation head and a second irradiation head. The first irradiation head and the second irradiation head may each be configured to perform laser light irradiation on a workpiece. The laser unit section may include a first laser unit and a second laser unit. The first laser unit may be configured to output first laser light, and the second laser unit may be configured to output second laser light. The beam delivery section may be provided in an optical path between the laser unit section and the irradiation head section. The beam delivery section may be configured to perform switching of optical paths between an optical path of the first laser light and an optical path of the second laser light to cause one of the first laser light and the second laser light to enter one of the first irradiation head and the second irradiation head. The first beam property varying section may be provided in an optical path between the first laser unit and the irradiation head section. The first beam property varying section may be configured to vary a beam property of one of the first laser light and the second laser light in response to the switching of the optical paths by the beam delivery section. The second beam property varying section may be provided in an optical path between the second laser unit and the irradiation head section. The second beam property varying section may be configured to vary a beam property of one of the first laser light and the second laser light in response to the switching of the optical paths by the beam delivery section.

BRIEF DESCRIPTION OF THE DRAWINGS

Hereinafter, some embodiments of the present disclosure will be described as mere examples with reference to the accompanying drawings.

DETAILED DESCRIPTION

Contents

Figure 1:
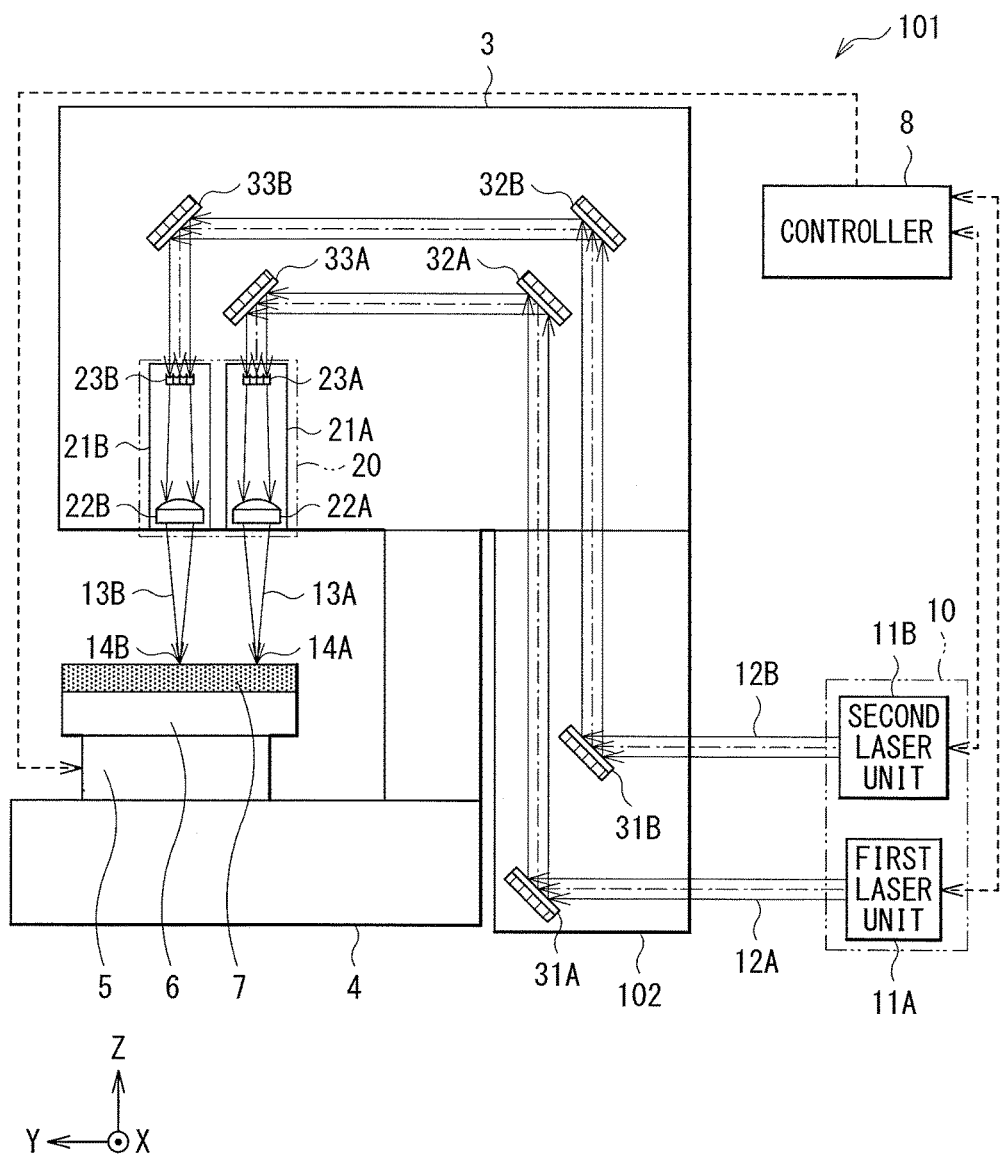
FIG. 1 schematically illustrates a configuration example of a laser annealing apparatus according to a comparative example.

<1. Comparative Example> (Laser Annealing Apparatus) (FIG. 1 to FIG. 3)
1.1 Configuration
1.2 Operation
1.3 Issues
<2. First Embodiment> (Laser Annealing Apparatus Provided with Beam Property Varying Section) (FIG. 4 to FIG. 10)
2.1 Configuration
2.2 Operation
2.3 Advantageous Effects
<3. Second Embodiment> (Variations of Each Section and Specific Examples of Each Section)
3.1 First Configuration Example of Beam Property Varying Section (Optical Path Length Varying Device) (FIG. 11)
3.1.1 Configuration
3.1.2 Operation
3.1.3 Advantageous Effects
3.2 Second Configuration Example of Beam Property Varying Section (Beam Transfer Device) (FIG. 12 to FIG. 14)
3.2.1 Configuration
3.2.2 Operation
3.2.3 Advantageous Effects
3.3 Configuration Example of Laser Unit (FIG. 15)
3.3.1 Configuration
3.3.2 Operation
3.4 Variations of Irradiation Head
3.4.1 First Configuration Example of Irradiation Head (Beam Homogenizer) (FIG. 16 and FIG. 17)
3.4.2 Second Configuration Example of Irradiation Head (Configuration Example Including Mask and Transfer Lens) (FIG. 18 and FIG. 19)
3.4.3 Third Configuration Example of Irradiation Head (Configuration Example Including Bi-telecentric Optical System) (FIG. 20 and FIG. 21)
3.4.4 Configuration Example of Fly-eye Lens (FIG. 22)
<4. Third Embodiment> (Variations on Arrangement of Beam Property Varying Section) (FIG. 23 to FIG. 25)
4.1 Configuration
4.2 Operation
<5. Fourth Embodiment> (Laser Annealing Apparatus Provided with Three or More Laser Units) (FIG. 26)
5.1 Configuration
5.2 Operation
5.3 Advantageous Effects
<6. Hardware Environment of Controller> (FIG. 27)
<7. Et Cetera>

Hereinafter, embodiments of the present disclosure will be described in detail with reference to the drawings. Embodiments described hereinafter are several examples of the present disclosure and are not intended to limit the content of the present disclosure. In addition, not all of the configurations and the operations described in the embodiments are necessarily essential as the configurations and the operations of the present disclosure. It is to be noted that identical constituent elements are given identical reference characters, and duplicate descriptions thereof will be omitted.

1. COMPARATIVE EXAMPLE 1.1 Configuration

Figure 2:
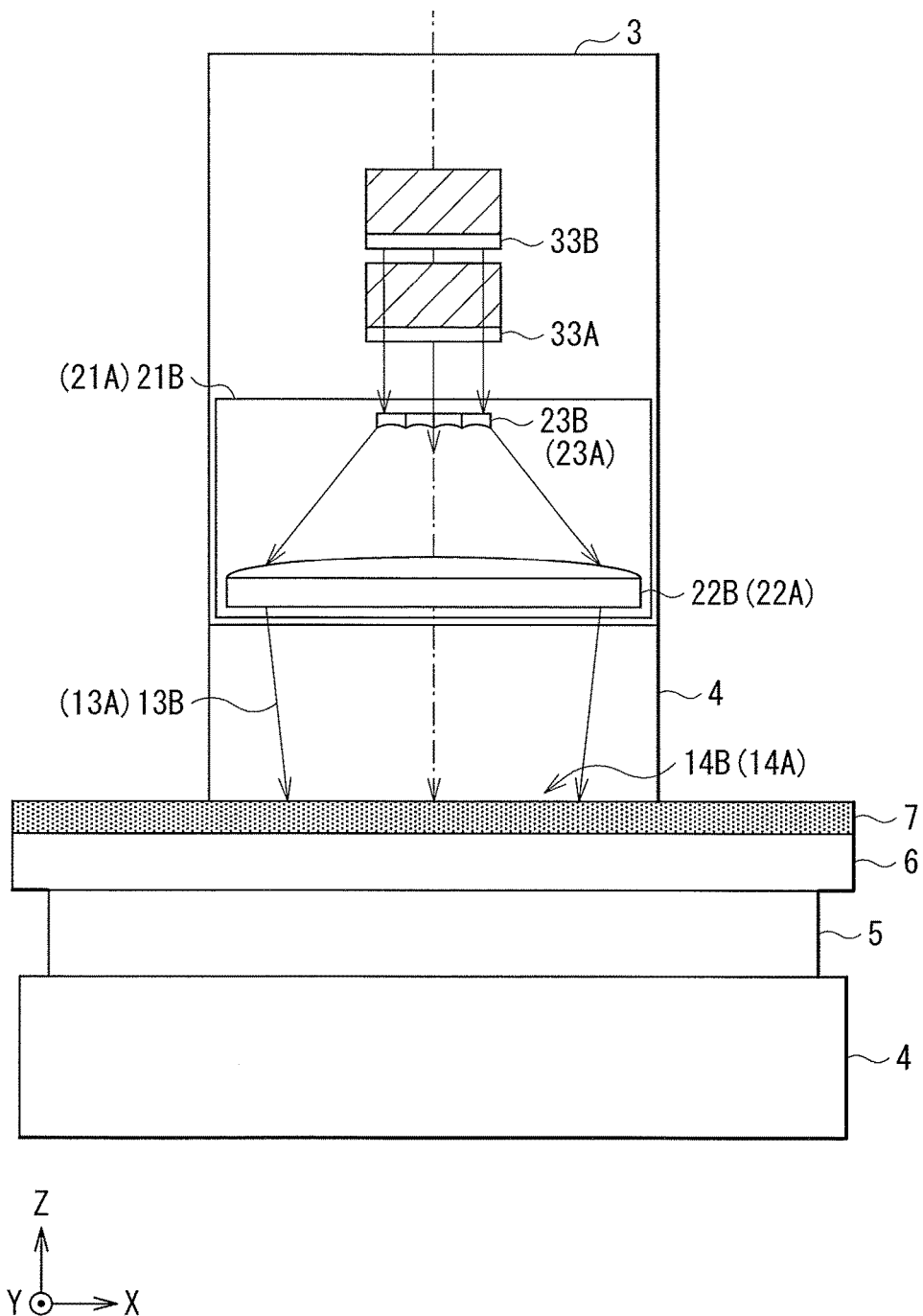
FIG. 2 schematically illustrates a configuration example of the laser annealing apparatus illustrated in FIG. 1, as viewed in a Y-axis direction.

FIG. 1 and FIG. 2 schematically illustrate a configuration example of a laser annealing apparatus 101 serving as a comparative example with respect to embodiments of the present disclosure. FIG. 2 schematically illustrates a configuration example of the laser annealing apparatus 101 illustrated in FIG. 1, as viewed in a Y-axis direction.

In the specification, a direction opposite to the gravitational direction may be a Z-axis direction. Two directions substantially orthogonal to the Z-axis direction may be an X-axis direction and the Y-axis direction. The X-axis direction may be the direction substantially orthogonal to the paper plane of FIG. 1.

The laser annealing apparatus 101 may irradiate an amorphous silicon film on a workpiece 7 with pulsed laser light to crystalize the amorphous silicon film. Thus, the laser annealing apparatus 101 may reform the amorphous silicon film into a polysilicon film to form a thin-film transistor. The workpiece 7 may be a glass substrate coated, on its surface, with an amorphous silicon film.

The laser annealing apparatus 101 may include a beam delivery section 102, an optical system 3, a frame 4, an XYZ stage 5, a table 6, a controller 8, and a laser unit section 10.

The XYZ stage 5 may be fixed to the frame 4. The table 6 may be disposed on the XYZ stage 5. The table 6 may be movable in the X-axis direction, the Y-axis direction, and the Z-axis direction with the XYZ stage 5. The directions in which the table 6 is moved by the XYZ stage 5 may be controlled by the controller 8. The workpiece 7 may be fixed onto the table 6 and may thus be movable, along with the table 6, in the X-axis direction, the Y-axis direction, and the Z-axis direction.

The laser unit section 10 may include a first laser unit 11A and a second laser unit 11B. The first laser unit 11A may output first laser light 12A, and the second laser unit 11B may output second laser light 12B. The first laser light 12A and the second laser light 12B may each be pulsed laser light that anneals and crystalizes an amorphous silicon film on the workpiece 7. The first and second laser units 11A and 11B may each be an excimer laser, for example. The first laser light 12A and the second laser light 12B output from the first laser unit 11A and the second laser unit 11B, respectively, may have substantially the same beam property, namely, substantially the same beam size and substantially the same beam divergence (beam divergence angle).

The beam delivery section 102 may include first high reflection mirrors 31A and 31B. The first high reflection mirror 31A may be disposed to deliver the first laser light 12A from the first laser unit 11A to the optical system 3. The first high reflection mirror 31B may be disposed to deliver the second laser light 12B from the second laser unit 11B to the optical system 3.

The optical system 3 may include an irradiation head section 20, second high reflection mirrors 32A and 32B, and third high reflection mirrors 33A and 33B. The irradiation head section 20 may include first and second irradiation heads 21A and 21B.

The second high reflection mirror 32A and the third high reflection mirror 33A may be disposed to direct the first laser light 12A to the first irradiation head 21A. The second high reflection mirror 32B and the third high reflection mirror 33B may be disposed to direct the second laser light 12B to the second irradiation head 21B.

The first and second irradiation heads 21A and 21B may be configured to substantially the same specifications. The first irradiation head 21A may be disposed to direct a line beam 13A to a first irradiation line 14A on the workpiece 7 for forming of a thin-film transistor. The second irradiation head 21B may be disposed to direct a line beam 13B to a second irradiation line 14B on the workpiece 7 for forming of a thin-film transistor.

The first irradiation head 21A may include a first fly-eye lens 23A and a first condenser optical system 22A. The second irradiation head 21B may include a second fly-eye lens 23B and a second condenser optical system 22B.

The first fly-eye lens 23A and the first condenser optical system 22A may cause the line beam 13A, with which the first irradiation line 14A is irradiated, to have a uniform irradiation region.

The second fly-eye lens 23B and the second condenser optical system 22B may cause the line beam 13B, with which the second irradiation line 14B is irradiated, to have a uniform irradiation region.

An optical path length L(1) of the first laser light 12A between the first laser unit 11A and a reference position P1 of the first irradiation head 21A may be substantially equal to an optical path length L(2) of the second laser light 12B between the second laser unit 11B and a reference position P1 of the second irradiation head 21B (L(1)≈L(2)). Specific examples of the reference position P1 will be described later with reference to FIG. 16 to FIG. 21.

1.2 Operation

Figure 3:
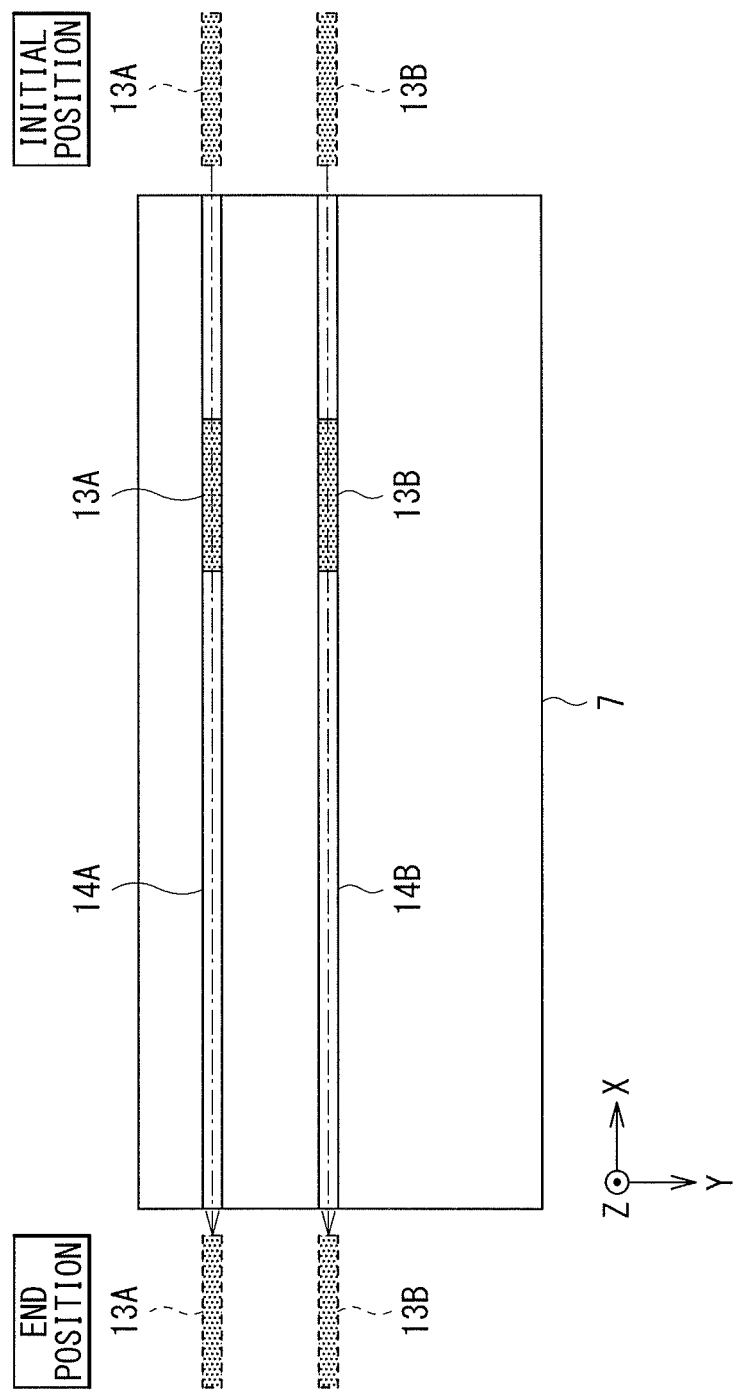
FIG. 3 schematically illustrates an example of an irradiation line of a line beam on a workpiece in the laser annealing apparatus according to the comparative example.

FIG. 3 schematically illustrates an example of the irradiation lines of the line beams 13A and 13B on the workpiece 7 in the laser annealing apparatus 101 according to the comparative example.

As illustrated in FIG. 3, the controller 8 may control the XYZ stage 5 to bring respective irradiation positions of the line beams 13A and 13B to initial positions.

The controller 8 may cause the first and second laser units 11A and 11B to oscillate substantially simultaneously. Thus, the first laser light 12A and the second laser light 12B output from the first laser unit 11A and the second laser unit 11B, respectively, may have substantially the same repetition frequency and substantially the same pulse energy.

Next, the controller 8 may control the XYZ stage 5 to accelerate the workpiece 7 in the X-axis direction and then to set the workpiece 7 in a uniform linear motion. With this operation, the first irradiation line 14A on the workpiece 7 may be irradiated with the line beam 13A from the first irradiation head 21A. In addition, the second irradiation line 14B on the workpiece 7 may be irradiated with the line beam 13B from the second irradiation head 21B. Thus, the amorphous silicon film on the workpiece 7 may be annealed and crystalized.

Upon the line beams 13A and 13B having passed the workpiece 7 and reaching predetermined end positions, the controller 8 may control the XYZ stage 5 to stop the movement of the workpiece 7 in the X-axis direction. With the above operation, a crystalized silicon film may be formed on a line for forming of a thin-film transistor on the workpiece 7.

1.3 Issues

As in the laser annealing apparatus 101, in a case where a plurality of laser units are provided and a plurality of irradiation lines on the workpiece 7 are annealed substantially simultaneously, the following issue may arise. Specifically, if even a single laser unit stops and comes to be inoperable due to a mechanical problem or for maintenance, the laser annealing apparatus 101 as a whole may stop, which may render the overall annealing process difficult.

To be more specific, for example, if the second laser unit 11B experiences a mechanical problem or is stopped for maintenance, the delivery of the second laser light 12B to the second irradiation head 21B may stop. This may make it difficult to irradiate the second irradiation line 14B on the workpiece 7 with the line beam 13B. This, in turn, may make it difficult to anneal a necessary portion of the amorphous silicon film on the workpiece 7.

2. FIRST EMBODIMENT

Now, a laser annealing apparatus according to a first embodiment of the present disclosure will be described. In the following, constituent elements that are substantially the same as those of the laser annealing apparatus according to the comparative example described above are given identical reference characters, and descriptions thereof will be omitted as appropriate.

In the present embodiment, an example of a laser annealing apparatus is illustrated as an example of a laser irradiation apparatus, but the techniques according to the present disclosure are not limited to a laser annealing apparatus.

2.1 Configuration

Figure 4:
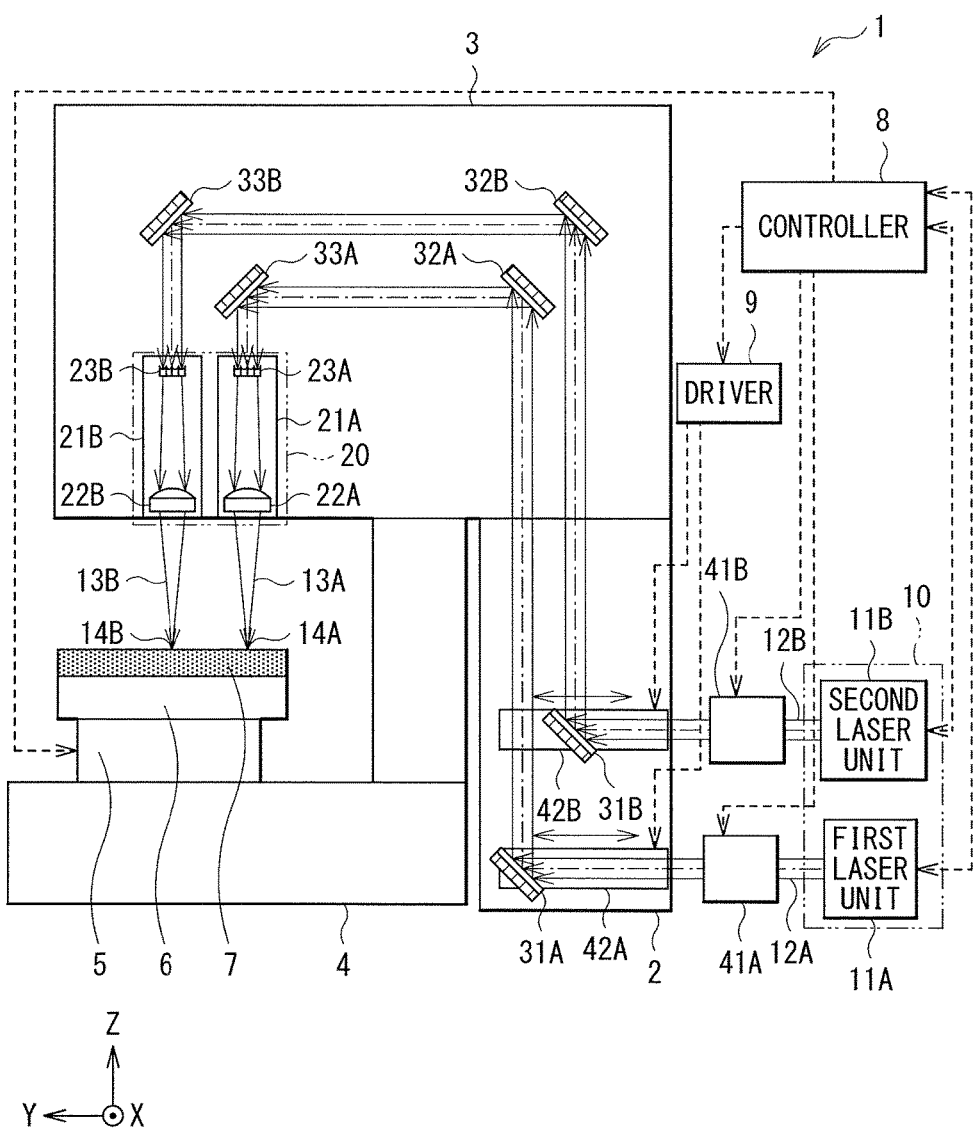
FIG. 4 schematically illustrates a configuration example of a laser annealing apparatus according to a first embodiment of the present disclosure.

FIG. 4 schematically illustrates a configuration example of a laser annealing apparatus 1 according to the first embodiment of the present disclosure.

The laser annealing apparatus 1 may include, in addition to the configurations of the laser annealing apparatus 101 according to the comparative example, a driver 9 and first and second beam property varying sections 41A and 41B. In addition, the laser annealing apparatus 1 may include a beam delivery section 2, in place of the beam delivery section 102 in the laser annealing apparatus 101 according to the comparative example.

The beam delivery section 2 may be disposed in an optical path between the laser unit section 10 and the irradiation head section 20. The beam delivery section 2 may be able to switch between an optical path of the first laser light 12A and an optical path of the second laser light 12B. Thus, one of the first laser light 12A and the second laser light 12B may enter one of the first irradiation head 21A and the second irradiation head 21B.

The beam delivery section 2 may switch between the optical paths under the control by the controller 8 via the driver 9.

The beam delivery section 2 may include first and second linear stages 42A and 42B. The first high reflection mirror 31A may be disposed on the first linear stage 42A with a holder interposed therebetween. The first high reflection mirror 31B may be disposed on the second linear stage 42B with a holder interposed therebetween. Moving the positions of the first high reflection mirrors 31A and 31B on the first and second linear stages 42A and 42B may make it possible to switch between the optical paths of the first laser light 12A and the second laser light 12B. Switching of the optical paths by the beam delivery section 2 may selectively allow the first laser light 12A and the second laser light 12B to enter either one of the first and second irradiation heads 21A and 21B.

The first beam property varying section 41A may be disposed in an optical path between the first laser unit 11A and the irradiation head section 20. To be more specific, the first beam property varying section 41A may be disposed in an optical path of the first laser light 12A between the first laser unit 11A and the beam delivery section 2. The first beam property varying section 41A may vary the beam property of the first laser light 12A in response to the switching of the optical paths by the beam delivery section 2.

The second beam property varying section 41B may be disposed in an optical path between the second laser unit 11B and the irradiation head section 20. To be more specific, the second beam property varying section 41B may be disposed in an optical path of the second laser light 12B between the second laser unit 11B and the beam delivery section 2. The second beam property varying section 41B may vary the beam property of the second laser light 12B in response to the switching of the optical paths by the beam delivery section 2.

Figure 11:
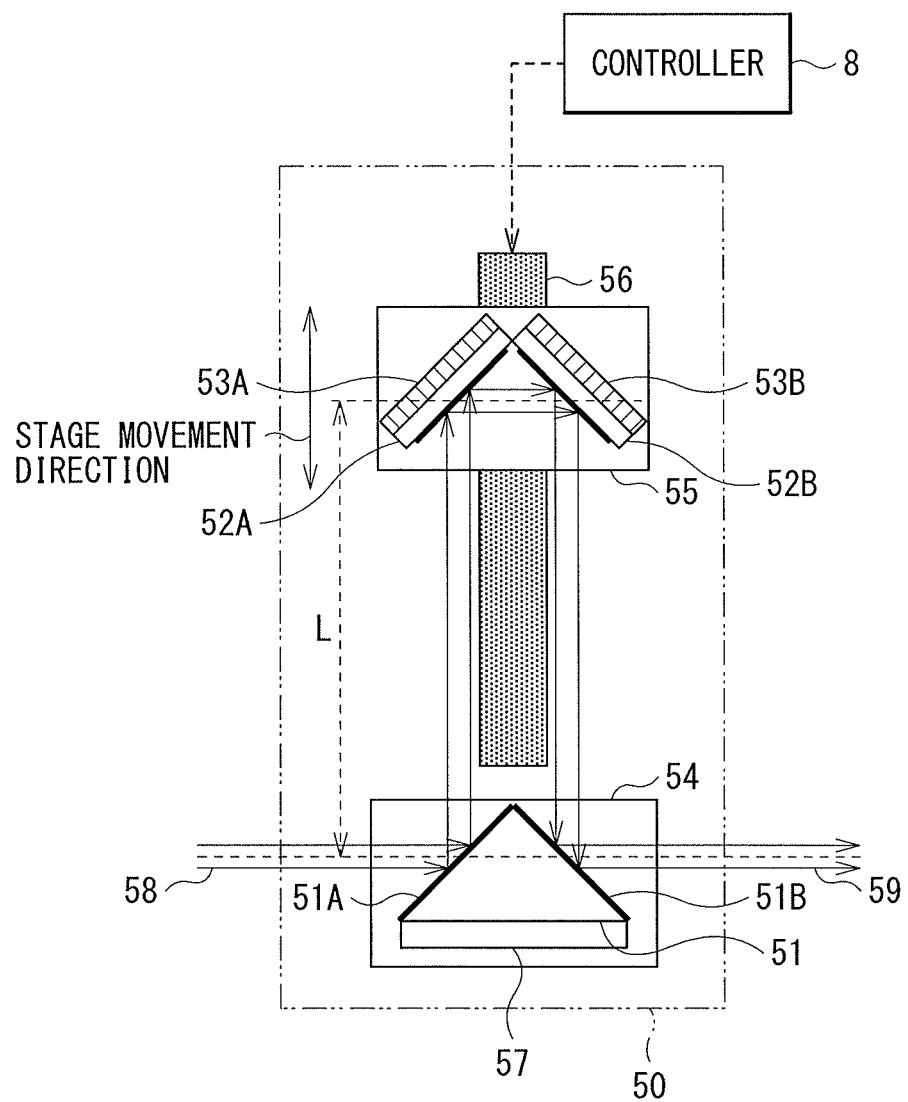
FIG. 11 schematically illustrates a first configuration example of first and second beam property varying sections in the laser annealing apparatus according to the first embodiment.

The first and second beam property varying sections 41A and 41B may each be constituted by an optical path length varying device, as illustrated in FIG. 11 described later.

The first beam property varying section 41A may be a first optical path length varying section configured to vary an optical path length of the first laser light 12A. The first optical path length varying section may be able to adjust the optical path length of the first laser light 12A to cause a first optical path length to be substantially equal to a second optical path length. The first optical path length may be an optical path length between the first laser unit 11A and the first irradiation head 21A upon switching of the optical paths to cause the first laser light 12A to enter the first irradiation head 21A. The second optical path length may be an optical path length between the first laser unit 11A and the second irradiation head 21B upon switching of the optical paths to cause the first laser light 12A to enter the second irradiation head 21B.

The second beam property varying section 41B may be a second optical path length varying section configured to vary an optical path length of the second laser light 12B. The second optical path length varying section may be able to adjust the optical path length of the second laser light 12B to cause a first optical path length to be substantially equal to a second optical path length. The first optical path length may be an optical path length between the second laser unit 11B and the second irradiation head 21B upon switching of the optical paths to cause the second laser light 12B to enter the second irradiation head 21B. The second optical path length may be an optical path length between the second laser unit 11B and the first irradiation head 21A upon switching of the optical paths to cause the second laser light 12B to enter the first irradiation head 21A.

Figure 12:
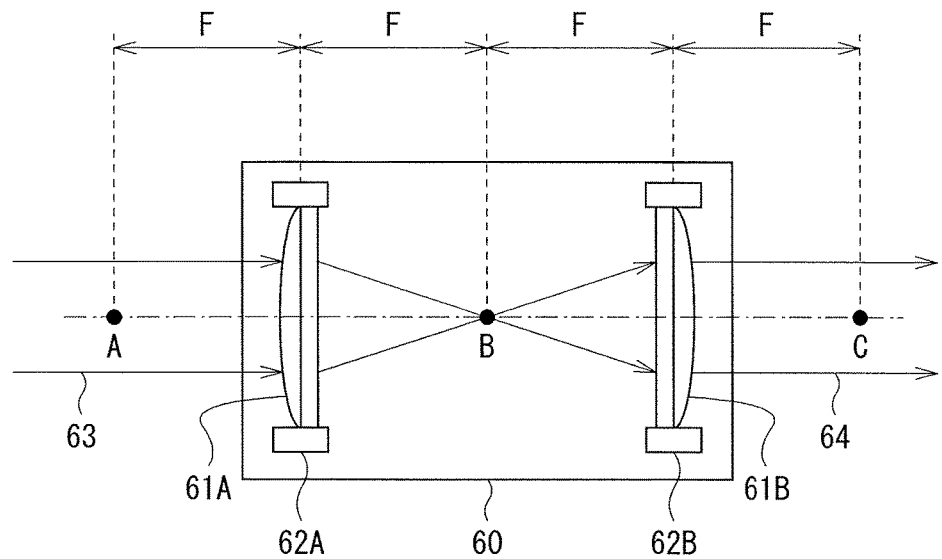
FIG. 12 schematically illustrates a configuration example of a beam transfer device applied to a second configuration example of the first and second beam property varying sections in the laser annealing apparatus according to the first embodiment.
Figure 13:
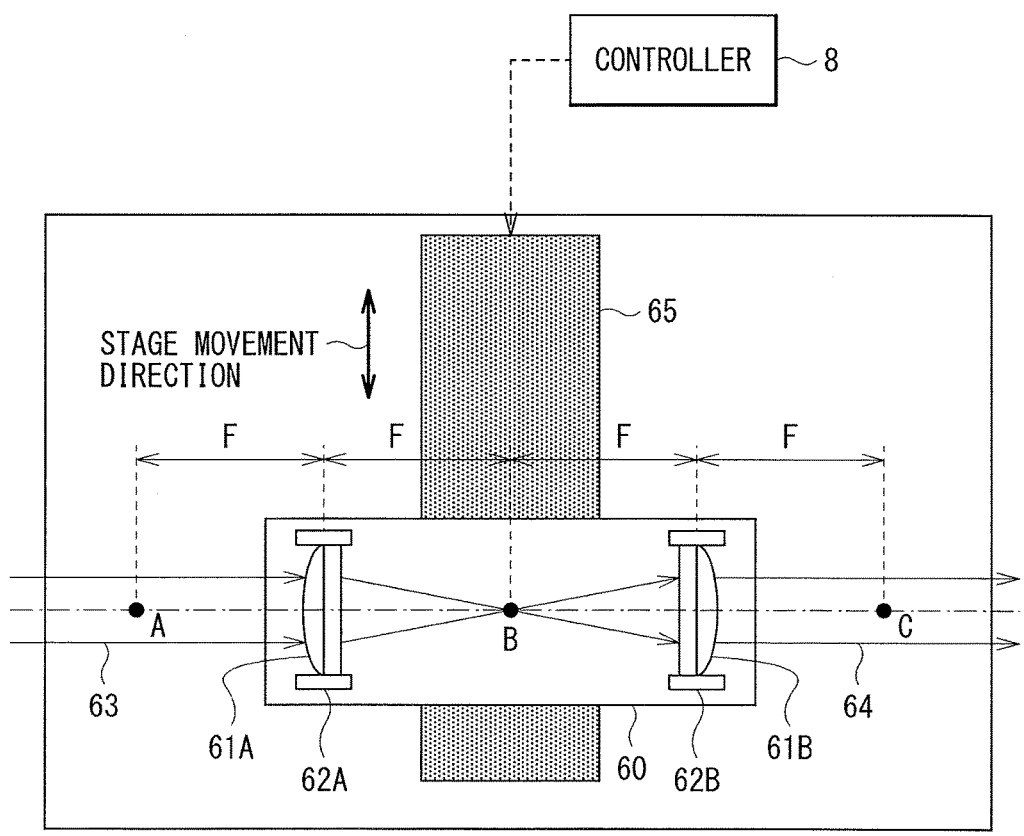
FIG. 13 schematically illustrates an example in which a beam transfer device and a single-axis stage are combined, serving as a second configuration example of a beam property varying section.
Figure 14:
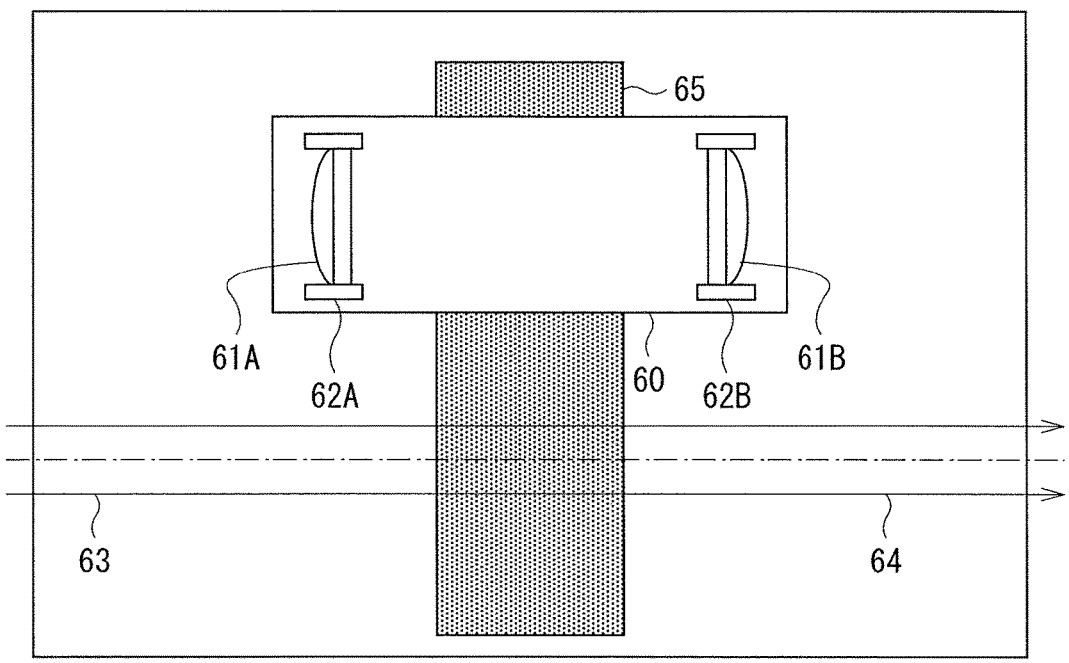
FIG. 14 schematically illustrates an example in which a beam transfer device and a single-axis stage are combined, serving as a second configuration example of a beam property varying section.

As illustrated in FIG. 12 to FIG. 14 described later, the first and second beam property varying sections 41A and 41B may each include a beam transfer device.

The first beam property varying section 41A may be a first transfer optical system configured to vary the beam property of the first laser light 12A. The first transfer optical system may be able to adjust the beam property of the first laser light 12A to cause a first beam size and a first beam divergence angle to be respectively substantially equal to a second beam size and a second beam divergence angle. The first beam size and the first beam divergence angle may be, respectively, a beam size and a beam divergence angle of the first laser light 12A upon switching of the optical paths to cause the first laser light 12A to enter the first irradiation head 21A. The second beam size and the second beam divergence angle may be, respectively, a beam size and a beam divergence angle of the first laser light 12A upon switching of the optical paths to cause the first laser light 12A to enter the second irradiation head 21B.

The second beam property varying section 41B may be a second transfer optical system configured to vary the beam property of the second laser light 12B. The second transfer optical system may be able to adjust the beam property of the second laser light 12B to cause a first beam size and a first beam divergence angle to be respectively substantially equal to a second beam size and a second beam divergence angle. The first beam size and the first beam divergence angle may be, respectively, a beam size and a beam divergence angle of the second laser light 12B upon switching of the optical paths to cause the second laser light 12B to enter the second irradiation head 21B. The second beam size and the second beam divergence angle may be, respectively, a beam size and a beam divergence angle of the second laser light 12B upon switching of the optical paths to cause the second laser light 12B to enter the first irradiation head 21A.

The first laser unit 11A may output a predetermined signal denoting operation halt to the controller 8 on condition that the first laser unit 11A comes to be inoperable due to a mechanical problem or for maintenance, and the second laser unit 11B may output a predetermined signal denoting operation halt to the controller 8 on condition that the second laser unit 11B comes to be inoperable due to a mechanical problem or for maintenance.

The controller 8 may control the beam delivery section 2 to switch between the optical paths on condition that either one of the first and second laser units 11A and 11B comes to be inoperable.

In a case where the first and second laser units 11A and 11B are both operable, as illustrated in FIG. 4, the controller 8 may control the beam delivery section 2 to cause the first laser light 12A to enter the first irradiation head 21A and to cause the second laser light 12B to enter the second irradiation head 21B.

Figure 5:
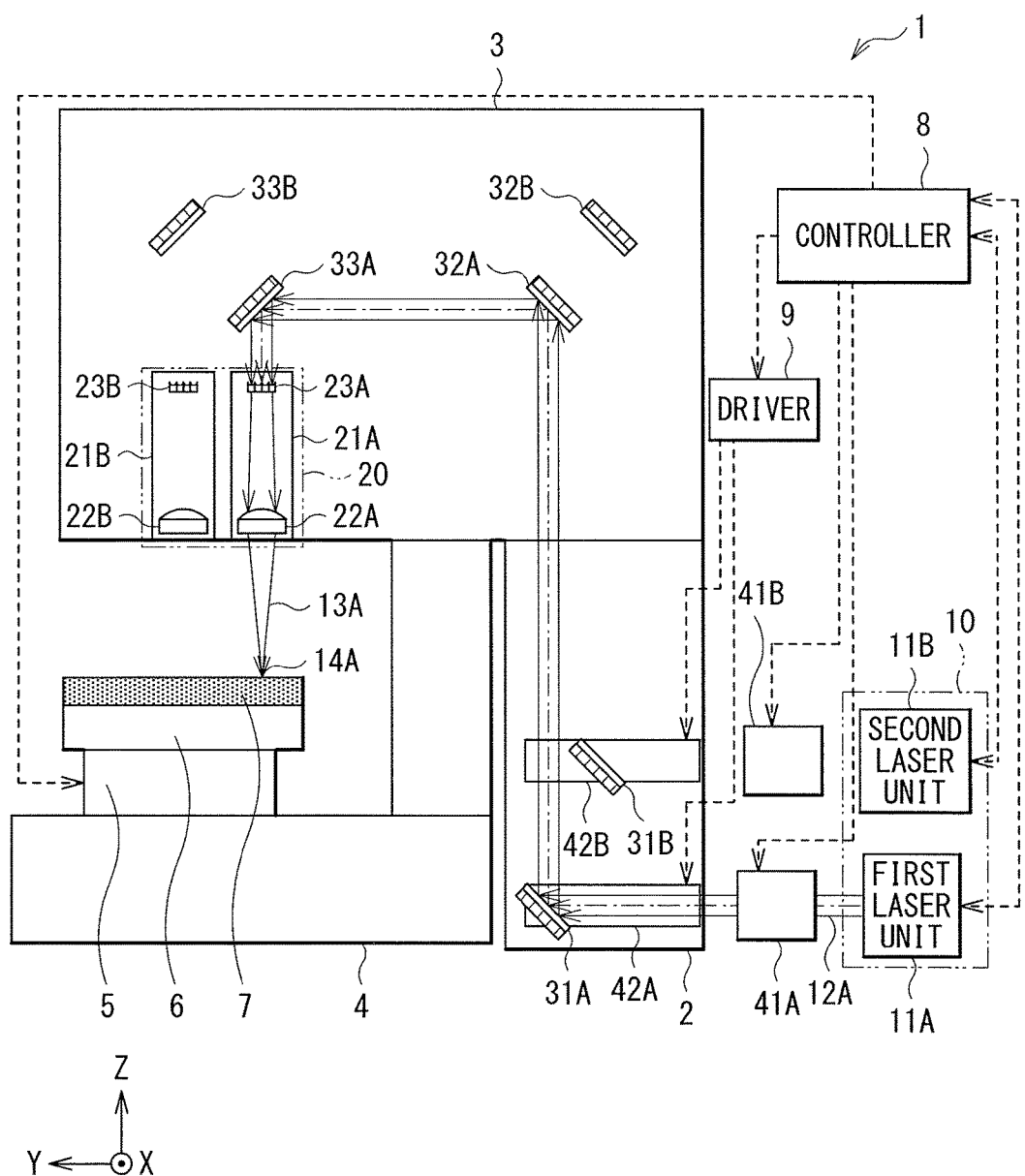
FIG. 5 schematically illustrates a fist state in a case where a first laser unit alone is made to oscillate in the laser annealing apparatus according to the first embodiment.
Figure 6:
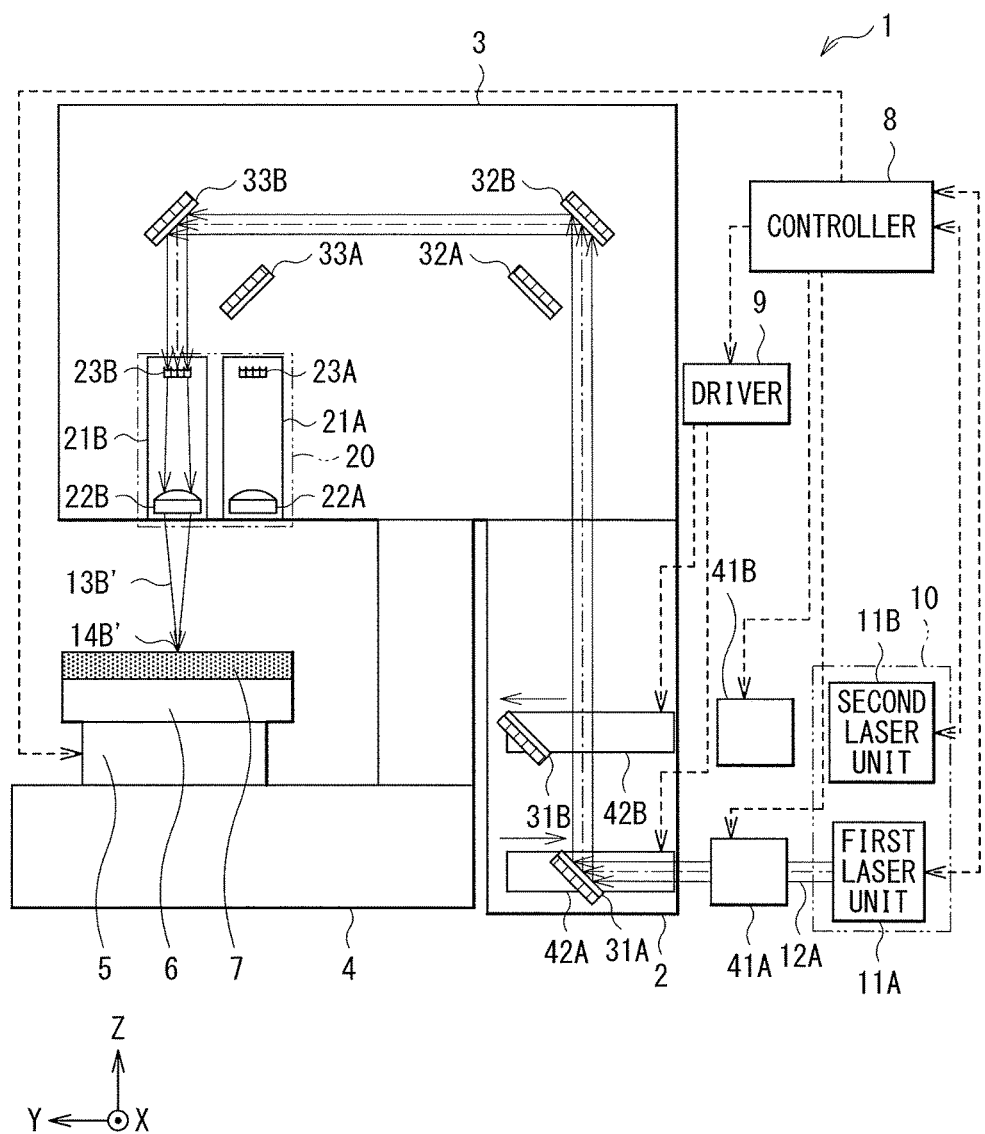
FIG. 6 schematically illustrates a second state in a case where the first laser unit alone is made to oscillate in the laser annealing apparatus according to the first embodiment.

In a case where either one of the first and second laser units 11A and 11B is inoperable, the controller 8 may control the beam delivery section 2 to cause the laser light output from an operable one of the first and second laser units 11A and 11B to enter one of the first and second irradiation heads 21A and 21B and then to enter the other one of the first and second irradiation heads 21A and 21B. For example, in a case where the first laser unit 11A is an operable laser unit, the controller 8 may control the beam delivery section 2 to cause the first laser light 12A to enter the first irradiation head 21A, as illustrated in FIG. 5 described later, and then to enter the second irradiation head 21B, as illustrated in FIG. 6 described later.

In addition, in a case where either one of the first and second laser units 11A and 11B comes to be inoperable, the controller 8 may control one of the first and second beam property varying sections 41A and 41B in response to the switching of the optical paths by the beam delivery section 2 to vary the beam property of the laser light output from an operable one of the first and second laser units 11A and 11B.

Other configurations may be substantially similar to those of the laser annealing apparatus 101 according to the comparative example described above.

2.2 Operation

With reference to FIG. 5 to FIG. 10, an operation of the laser annealing apparatus 1 will be described.

FIG. 5 schematically illustrates a first state in a case where the first laser unit 11A alone is made to oscillate as an operable laser unit in the laser annealing apparatus 1. In the state illustrated in FIG. 5, the optical path is set by the beam delivery section 2 to cause the first laser light 12A from the first laser unit 11A to enter the first irradiation head 21A.

FIG. 6 schematically illustrates a second state in the case where the first laser unit 11A alone is made to oscillate as an operable laser unit in the laser annealing apparatus 1. In the state illustrated in FIG. 6, the optical path has been switched from that in the state illustrated in FIG. 5 by the beam delivery section 2, and the first laser light 12A from the first laser unit 11A enters the second irradiation head 21B.

Figure 7:
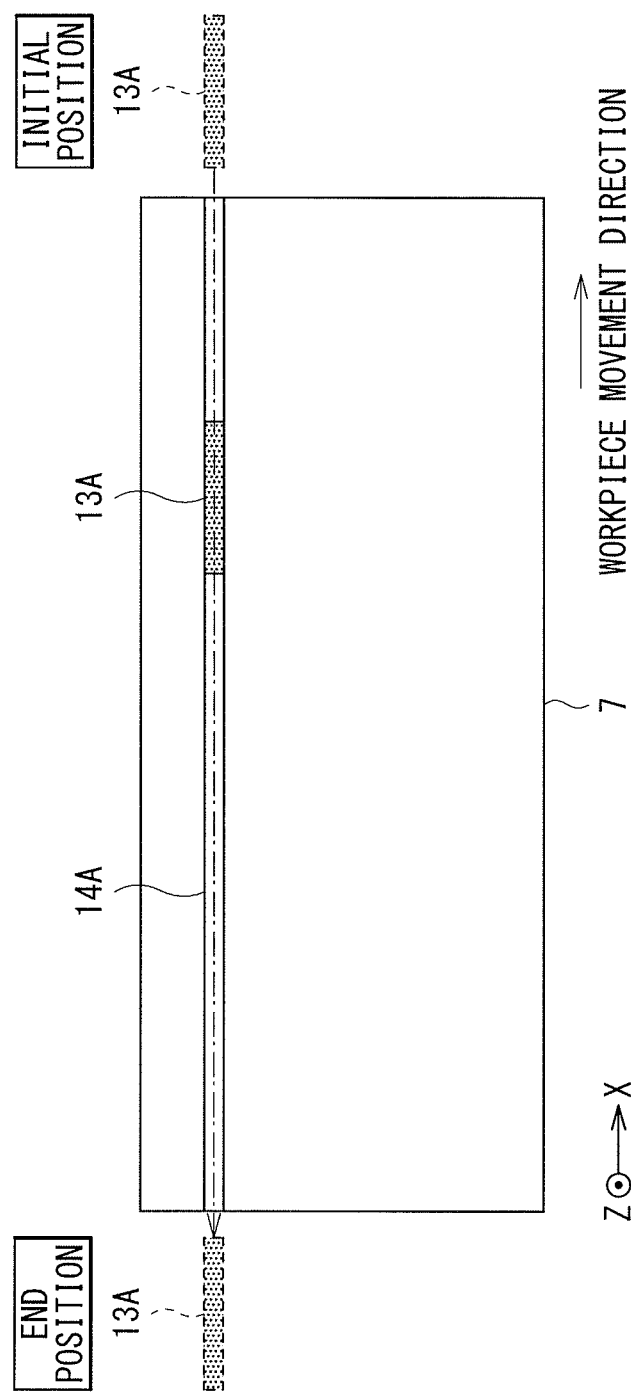
FIG. 7 schematically illustrates an example of an irradiation line of a line beam on a workpiece in the state illustrated in FIG. 5.
Figure 8:
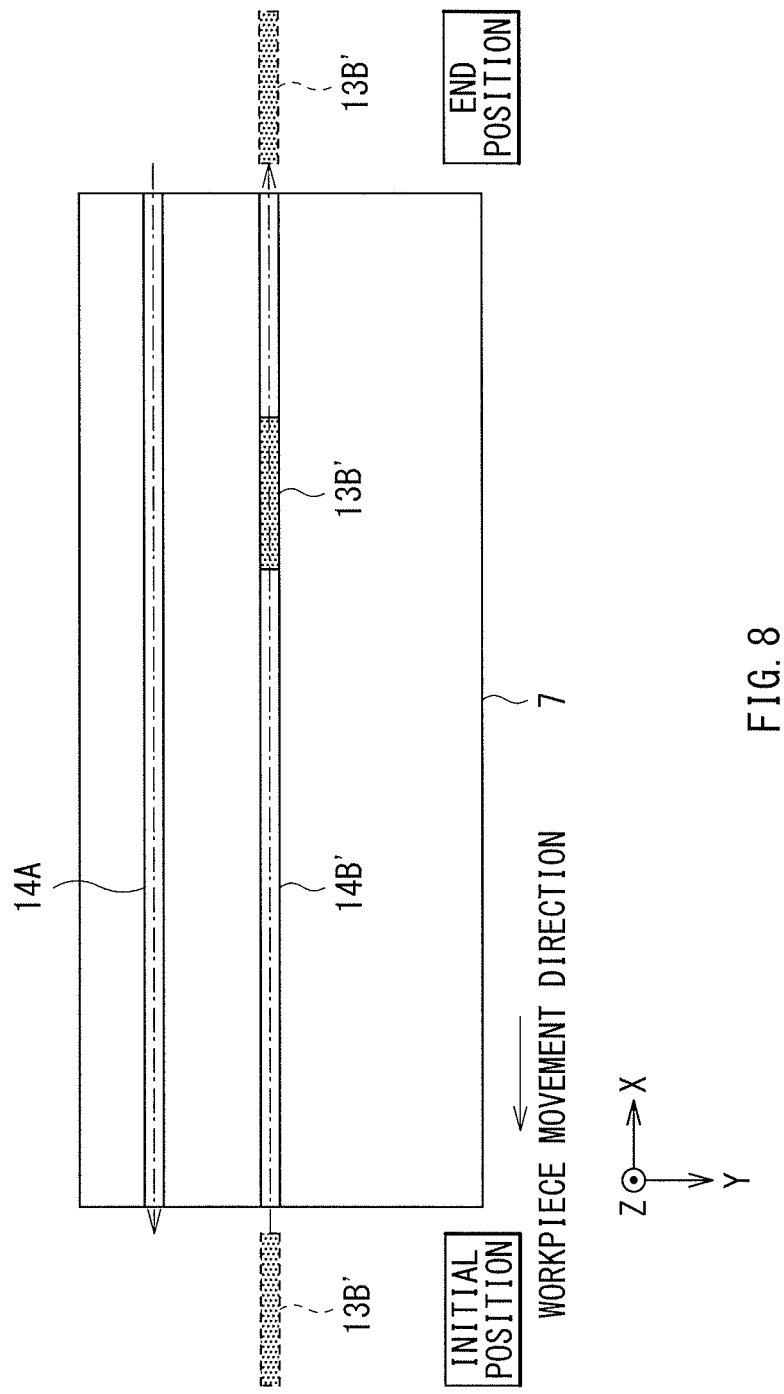
FIG. 8 schematically illustrates an example of an irradiation line of a line beam on a workpiece in the state illustrated in FIG. 6.

FIG. 7 schematically illustrates an example of the first irradiation line 14A of the line beam 13A on the workpiece 7 obtained in the state illustrated in FIG. 5. FIG. 8 schematically illustrates an example of an irradiation line 14B' of a line beam 13B' on the workpiece 7 obtained in the state illustrated in FIG. 6.

Figure 9:
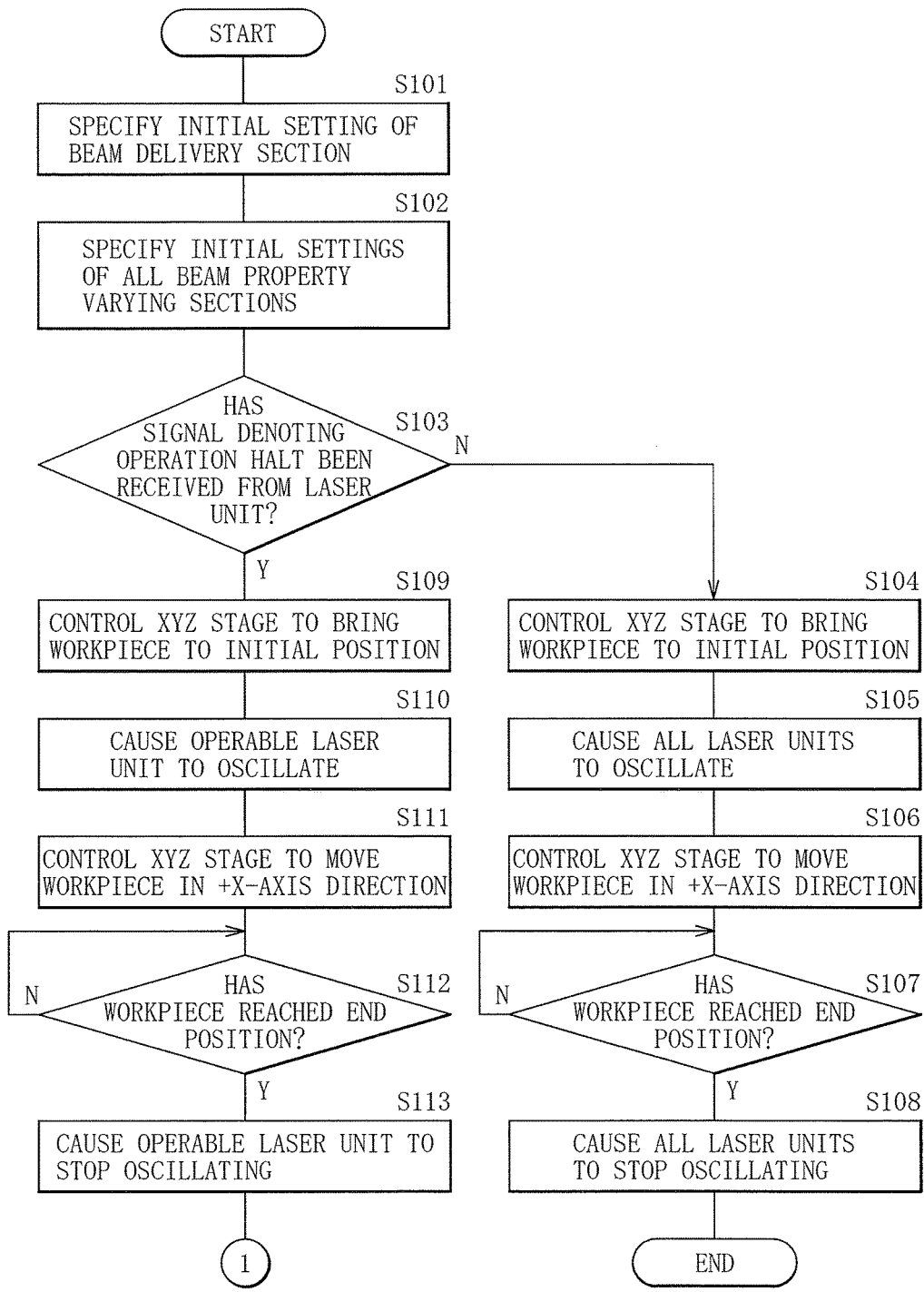
FIG. 9 illustrates a flowchart indicating an example of a flow of control by a controller 8.
Figure 10:
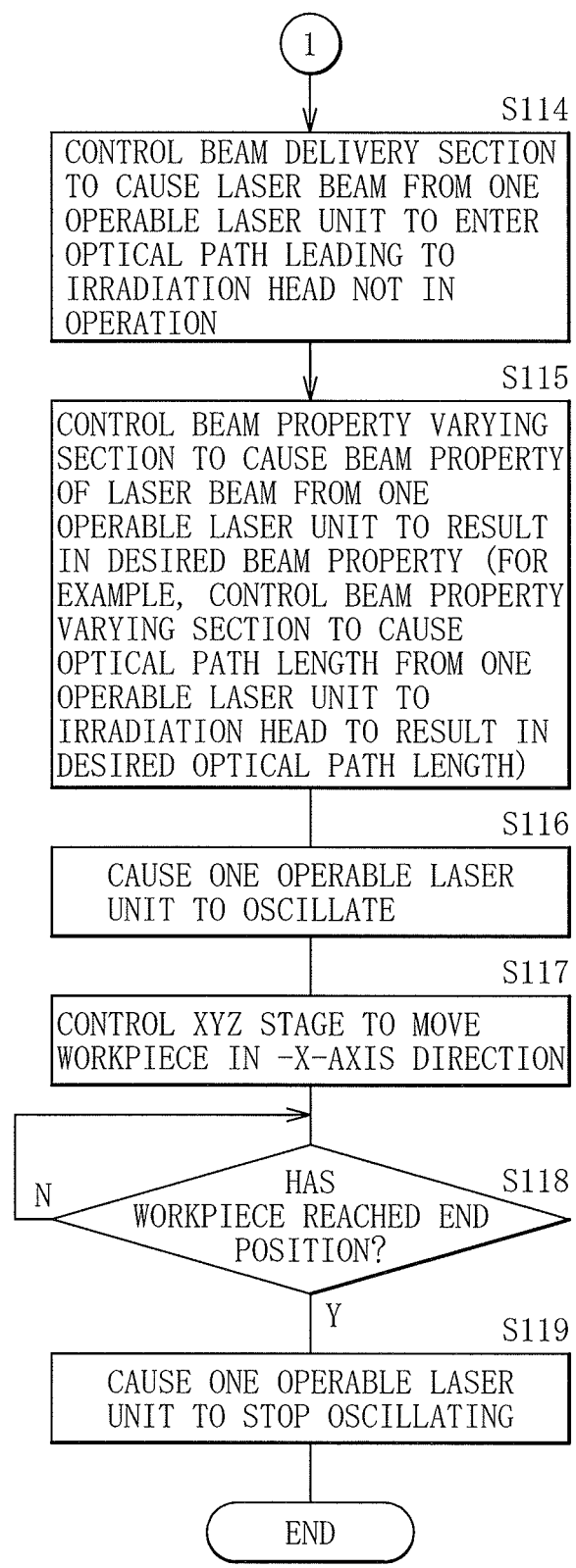
FIG. 10 is a continuation of the flowchart illustrated in FIG. 9.

FIG. 9 and FIG. 10 illustrate a flowchart indicating an example of a flow of control by the controller 8.

First, the controller 8 may specify an initial setting of the beam delivery section 2 (step S101). As the initial setting, the controller 8 may control, via the driver 9, the first and second linear stages 42A and 42B of the beam delivery section 2 and control the positions of the first high reflection mirrors 31A and 31B to cause the first laser light 12A to enter the first irradiation head 21A and to cause the second laser light 12B to enter the second irradiation head 21B, as illustrated in FIG. 4.

Then, the controller 8 may specify initial settings of all the beam property varying sections (step S102). For example, the controller 8 may control the first and second beam property varying sections 41A and 41B to make an optical path length from the first laser unit 11A to the reference position P1 of the first irradiation head 21A and an optical path length from the second laser unit 11B to the reference position P1 of the second irradiation head 21B each result in a predetermined optical path length. For example, if the first and second laser units 11A and 11B are configured to substantially the same specifications and if the first and second irradiation heads 21A and 21B are configured to substantially the same specifications, the optical path length from the first laser unit 11A to the reference position P1 of the first irradiation head 21A and the optical path length from the second laser unit 11B to the reference position P1 of the second irradiation head 21B may be made substantially equal to each other.

The controller 8 may then determine whether the controller 8 has received a signal denoting operation halt from the first and second laser units 11A and 11B (step S103). In a case where the controller 8 determines that the controller 8 has received no signal denoting operation halt (step S103; N), the controller 8 may carry out processing in steps S104 to S108. In a case where the controller 8 determines that the controller 8 has received a signal denoting operation halt (step S103; Y), the controller 8 may carry out processing in steps S109 to S119. In this example, the second laser unit 11B may be the laser unit that outputs the signal denoting operation halt.

First, the processing in steps S104 to S108 will be described.

In a case where the controller 8 determines that the controller 8 has received no signal denoting operation halt (step S103; N), the controller 8 may then control the XYZ stage 5 to bring the workpiece 7 to an initial position (step S104).

Next, as illustrated in FIG. 4, the controller 8 may cause all the laser units to oscillate (step S105). Specifically, the controller 8 may cause the first and second laser units 11A and 11B to oscillate substantially simultaneously. Thus, the first laser light 12A and the second laser light 12B output from the first laser unit 11A and the second laser unit 11B, respectively, may have substantially the same repetition frequency and substantially the same pulse energy.

Next, the controller 8 may control the XYZ stage 5 to move the workpiece 7 in the +X-axis direction (step S106).

The controller 8 may then determine whether the workpiece 7 has reached an end position (step S107). In a case where the controller 8 determines that the workpiece 7 has not reached the end position (step S107; N), the controller 8 may repeat the processing in step S107.

Meanwhile, in a case where the controller 8 determines that the workpiece 7 has reached the end position (step S107; Y), the controller 8 may cause all the laser units to stop oscillating (step S108). With this operation, the first irradiation line 14A on the workpiece 7 may be irradiated with the line beam 13A from the first irradiation head 21A, as illustrated in FIG. 3. In addition, the second irradiation line 14B on the workpiece 7 may be irradiated with the line beam 13B from the second irradiation head 21B. Thus, the amorphous silicon film on the workpiece 7 may be annealed and crystallized.

Next, the processing in steps S109 to S119 will be described.

In a case where the controller 8 determines that the controller 8 has received a signal denoting operation halt (step S103; Y), the controller 8 may then control the XYZ stage 5 to bring the workpiece 7 to an initial position (step S109).

Then, the controller 8 may cause an operable laser unit to oscillate (step S110). In this example, the operable laser unit may be the first laser unit 11A, as illustrated in FIG. 5. The controller 8 may cause the first laser unit 11A, serving as the operable laser unit, to oscillate, and the first laser unit 11A may output the first laser light 12A at a predetermined repetition frequency and with predetermined pulse energy.

Next, as illustrated in FIG. 7, the controller 8 may control the XYZ stage 5 to move the workpiece 7 in the +X-axis direction (step S111).

The controller 8 may then determine whether the workpiece 7 has reached an end position (step S112). In a case where the controller 8 determines that the workpiece 7 has not reached the end position (step S112; N), the controller 8 may repeat the processing in step S112.

Meanwhile, in a case where the controller 8 determines that the workpiece 7 has reached the end position (step S112; Y), the controller 8 may cause the operable laser unit to stop oscillating (step S113).

Next, the controller 8 may control the beam delivery section 2 to cause the optical path of the laser light from the operable laser unit to be switched to the optical path leading to the irradiation head that is not in operation (step S114). For example, the controller 8 may switch the optical path to the state illustrated in FIG. 6 in a case where the first laser unit 11A is the operable laser unit. As illustrated in FIG. 6, for example, the controller 8 may control the beam delivery section 2 via the driver 9 to cause the first laser light 12A from the first laser unit 11A to enter the second irradiation head 21B. In this case, as illustrated in FIG. 6, the controller 8 may move the second linear stage 42B to move the first high reflection mirror 31B in the +Y-axis direction and may move the first linear stage 42A to move the first high reflection mirror 31A in the -Y-axis direction.

Then, the controller 8 may control the beam property varying sections to cause the beam property of the laser light from the operable laser unit to result in a desired property (step S115). For example, the controller 8 may control the beam property varying sections to cause the optical path length from the operable laser unit to the irradiation head to result in a desired optical path length. For example, in a case where the first laser unit 11A is the operable laser unit, the controller 8 may control the first beam property varying section 41A to cause the optical path length from the first laser unit 11A to the reference position P1 of the second irradiation head 21B to result in a desired optical path length. With this operation, a change in the beam property of the line beam 13B' formed on the workpiece 7 by the second irradiation head 21B can be suppressed.

Next, the controller 8 may cause the operable laser unit to oscillate (step S116). In this example, the operable laser unit may be the first laser unit 11A, as illustrated in FIG. 6. The controller 8 may cause the first laser unit 11A, serving as the operable laser unit, to oscillate, and the first laser unit 11A may output the first laser light 12A at a predetermined repetition frequency and with predetermined pulse energy.

Then, as illustrated in FIG. 8, the controller 8 may control the XYZ stage 5 to move the workpiece 7 in the -X-axis direction (step S117).

The controller 8 may then determine whether the workpiece 7 has reached the end position (step S118). In a case where the controller 8 determines that the workpiece 7 has not reached the end position (step S118; N), the controller 8 may repeat the processing in step S118.

Meanwhile, in a case where the controller 8 determines that the workpiece 7 has reached the end position (step S118; Y), the controller 8 may cause the operable laser unit to stop oscillating (step S119). For example, the controller 8 may cause the first laser unit 11A, serving as the operable laser unit, to stop oscillating. With this operation, as illustrated in FIG. 8, the first irradiation line 14A on the workpiece 7 may be irradiated with the line beam 13A from the first irradiation head 21A, and then the second irradiation line 143 on the workpiece 7 may be irradiated with the line beam 13B' from the second irradiation head 21B. Thus, the amorphous silicon film on the workpiece 7 may be annealed and crystalized.

Other operations may be substantially similar to those of the laser annealing apparatus 101 according to the comparative example described above.

2.3 Advantageous Effects

With the laser annealing apparatus 1 according to the present embodiment, even in a case where one of the first and second laser units 11A and 11B comes to be inoperable, by controlling the beam delivery section 2, laser light from an operable one of the first and second laser units 11A and 11B may be introduced into the beam line of the laser unit that is not in operation. Consequently, the laser light may be made to enter the irradiation head that is not in operation, and the workpiece 7 may be irradiated with the laser light.

Furthermore, for example, by controlling the first and second beam property varying sections 41A and 41B to cause the optical path length from the operable laser unit to the irradiation head that is not in operation to result in a desired optical path length, a change in the property of the laser beam that enters the irradiation head can be suppressed.

Consequently, a change in the shape or the optical intensity distribution of the line beam formed by the irradiation head that is not in operation can be suppressed.

In addition, even if one of the laser units stops due to a mechanical problem or for maintenance, all the necessary irradiation lines on the workpiece 7 may be annealed by the laser light from the remaining operable laser unit(s), and thus the laser annealing apparatus 1 need not stop operating.

3. SECOND EMBODIMENT

Next, as a second embodiment of the present disclosure, variations and specific examples of each section of the laser annealing apparatus according to the first embodiment described above will be described. In the following, constituent elements that are substantially the same as those of the laser annealing apparatus according to the comparative example or the first embodiment described above are given identical reference characters, and descriptions thereof will be omitted as appropriate.

3.1 First Configuration Example of Beam Property Varying Section (Optical Path Length Varying Device)

3.1.1 Configuration

FIG. 11 schematically illustrates a first configuration example of the first and second beam property varying sections 41A and 41B in the laser annealing apparatus 1 illustrated in FIG. 4.

The first and second beam property varying sections 41A and 41B may each be constituted by an optical path length varying device 50 illustrated in FIG. 11.

The optical path length varying device 50 may include a right-angled prism 51, a first high reflection mirror 52A, a second high reflection mirror 52B, a plate 54, another plate 55, and a single-axis stage 56. The optical path length varying device 50 may further include a first holder 53A, a second holder 53B, and a holder 57. The first holder 53A may hold the first high reflection mirror 52A. The second holder 53B may hold the second high reflection mirror 52B. The holder 57 may hold the right-angled prism 51.

The right-angled prism 51 may be fixed to the plate 54 with the holder 57 interposed therebetween. The right-angled prism 51 may have a first reflection surface 51A and a second reflection surface 51B. The first reflection surface 51A and the second reflection surface 51B may be substantially orthogonal to each other. The first reflection surface 51A and the second reflection surface 51B may each be coated with a high reflection film.

The first and second high reflection mirrors 52A and 52B may each be coated, on its surface, with a high reflection film. In this example, the first and second high reflection mirrors 52A and 52B may be fixed to the plate 55 with the first and second holders 53A and 53B, respectively, interposed therebetween with the surfaces of the first and second high reflection mirrors 52A and 52B being substantially orthogonal to each other. The plate 55 may be fixed to the single-axis stage 56. With this configuration, the first and second high reflection mirrors 52A and 52B may be allowed to move, along with the plate 55, in a stage movement direction indicated in FIG. 11 on the single-axis stage 56. The controller 8 may control the single-axis stage 56 to control a movement amount of the first and second high reflection mirrors 52A and 52B.

3.1.2 Operation

An entering beam 58 of the laser light that has entered the optical path length varying device 50 may be incident on the first reflection surface 51A of the right-angled prism 51 at an angle of 45 degrees relative to the normal and may be reflected thereby at an angle of −45 degrees relative to the normal. The entering beam 58 of the laser light reflected by the first reflection surface 51A may be reflected with high reflectance by the first high reflection mirror 52A and the second high reflection mirror 52B and may then be incident on the second reflection surface 51B of the right-angled prism 51 at an angle of 45 degrees relative to the normal. Then, the entering beam 58 of the laser light may be reflected by the second reflection surface 51B at an angle of −45 degrees relative to the normal and output from the optical path length varying device 50 as an exit beam 59 of the laser light.

An optical path length between an incident position of the entering beam 58 of the laser light on the first reflection surface 51A of the right-angled prism 51 and an incident position of the entering beam 58 on the first high reflection mirror 52A may be L. In addition, an optical path length between an incident position of the entering beam 58 of the laser light on the second high reflection mirror 52B and an incident position of the entering beam 58 on the second reflection surface 51B of the right-angled prism 51 may be L. With this configuration, the optical path length of the entering beam 58 of the laser light that has entered the optical path length varying device 50 may be extended by 2 L, as compared to the optical path length obtained in a case where the laser light does not travel through the optical path length varying device 50.

Similarly to the example described in the first embodiment above, for example, in a case where the second laser unit 11B comes to be inoperable, the controller 8 may control the optical path length varying device 50, serving as the first beam property varying section 41A, in response to the switching of the optical paths by the beam delivery section 2, and may adjust the optical path length. For example, the controller 8 may control the optical path length varying device 50 to cause a first optical path length to be substantially equal to a second optical path length. The first optical path length may be an optical path length between the first laser unit 11A and the first irradiation head 21A, and the second optical path length may be an optical path length between the first laser unit 11A and the second irradiation head 21B.

3.1.3 Advantageous Effects

In the optical path length varying device 50, the optical path length may be adjusted by moving the first and second high reflection mirrors 52A and 52B along with the plate 55 on the single-axis stage 56. With this configuration, for example, a variation between the beam property obtained in a case where the first laser light 12A from the first laser unit 11A is made to enter the first irradiation head 21A and the beam property obtained in a case where the first laser light 12A from the first laser unit 11A is made to enter the second irradiation head 21B can be suppressed.

3.2 Second Configuration Example of Beam Property Varying Section (Beam Transfer Device)

3.2.1 Configuration

FIG. 12 to FIG. 14 schematically illustrate a second configuration example of the first and second beam property varying sections 41A and 41B in the laser annealing apparatus 1 illustrated in FIG. 4.

The first and second beam property varying sections 41A and 41B may each include a beam transfer device 60 illustrated in FIG. 12.

FIG. 12 illustrates a configuration example of the beam transfer device 60 applied to the second configuration example of the first and second beam property varying sections 41A and 41B. FIG. 13 and FIG. 14 schematically illustrate an example in which the beam transfer device 60 and a single-axis stage 65 are combined, serving as the second configuration example of the first and second beam property varying sections 41A and 41B.

The beam transfer device 60 may include a first convex lens 61A, a second convex lens 61B, a first holder 62A configured to hold the first convex lens 61A in place, and a second holder 62B configured to hold the second convex lens 61B in place.

The first convex lens 61A and the second convex lens 61B may each be formed of a material that transmits ultraviolet laser light, and examples of such a material may include synthetic quartz and $CaF_2$ crystal. The first convex lens 61A and the second convex lens 61B may have substantially the same focal length F. The first convex lens 61A and the second convex lens 61B may be disposed with an interval therebetween that is twice (2F) the focal length F.

3.2.2 Operation

An entering beam 63 of the laser light that has entered the beam transfer device 60 may be transmitted through the first convex lens 61A and condensed at a position B on a posterior focal point of the first convex lens 61A. The condensed entering beam 63 of the laser light may then diverge and be transmitted through the second convex lens 61B to be collimated. Thus, the entering beam 63 may be output from the beam transfer device 60 as an exit beam 64 of the laser light.

Here, a beam of the laser light at a position A on an anterior focal point of the first convex lens 61A may be transferred and imaged at a position C on a posterior focal point of the second convex lens 61B with a magnification of 1:1. Therefore, the beam of the laser light transferred and imaged at the position C with a magnification of 1:1 may have a substantially identical beam property to the beam at the position A in terms of the beam size and the beam divergence angle, although an image of the beam at the position C may be inverted.

As illustrated in FIG. 13 and FIG. 14, the beam transfer device 60 may be disposed on the single-axis stage 65 to constitute first and second transfer optical systems serving as the first and second beam property varying sections 41A and 41B.

By disposing the beam transfer device 60 on the single-axis stage 65 and by switching the passage state of the entering beam 63 of the laser light, an apparent optical path may be varied. In other words, an apparent optical path of the entering beam 63 of the laser light may be varied by switching between a state in which the laser light is made to pass through the beam transfer device 60 (FIG. 13) and a state in which the laser light is made not to pass through the beam transfer device 60 (FIG. 14).

The controller 8 may control the single-axis stage 65 in response to the switching of the optical paths by the beam delivery section 2 either to allow or not to allow the entering beam 63 of the laser light to pass through the beam transfer device 60.

3.2.3 Advantageous Effects

Even if the optical path length is extended by the distance (4F) in which the beam is transferred by the beam transfer device 60 with a magnification of 1:1, a change in the beam property of the laser light can be suppressed. For example, the first optical path length between the first laser unit 11A and the first irradiation head 21A and the second optical path length between the first laser unit 11A and the second irradiation head 21B may differ by 4F. In this case, switching the passage state of the first laser light 12A through the beam transfer device 60 makes it possible for the beam property of the first laser light 12A that enters the first irradiation head 21A to be substantially identical to the beam property of the first laser light 12A that enters the second irradiation head 21B.

Et Cetera

FIG. 12 to FIG. 14 illustrate a case where a transfer optical system is constituted by two convex lenses, but this is not a limiting example. The transfer optical system may be constituted by a bi-telecentric optical system configured to transfer and image a beam of laser light with a magnification of 1:1. In addition, for example, two beam transfer devices 60 may be disposed in series to obtain a configuration that provides a non-inverted transfer image.

3.3 Configuration Example of Laser Apparatus

3.3.1 Configuration

Figure 15:
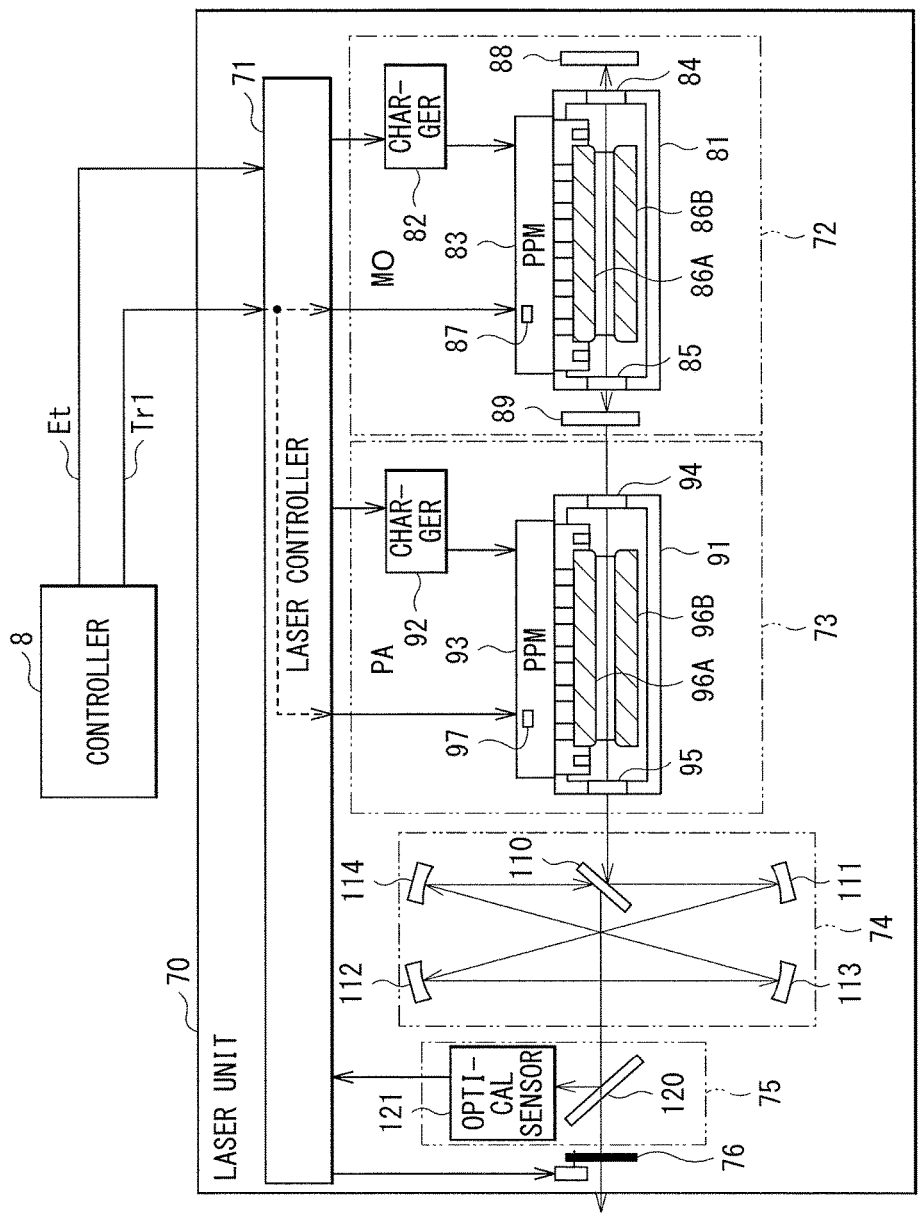
FIG. 15 schematically illustrates a configuration example of first and second laser units in the laser annealing apparatus according to the first embodiment.

FIG. 15 schematically illustrates a configuration example of the first and second laser units 11A and 11B in the laser annealing apparatus 1 illustrated in FIG. 4.

The first and second laser units 11A and 11B may each, for example, be an excimer laser unit of a master oscillator power amplifier (MOPA) type. For example, the first and second laser units 11A and 11B may each be constituted by a laser unit 70 illustrated in FIG. 15.

The laser unit 70 may include a laser controller 71, a master oscillator (MO) 72, a power amplifier (PA) 73, an optical pulse stretcher 74, a monitor module 75, and a shutter 76.

The PA 73, the optical pulse stretcher 74, the monitor module 75, and the shutter 76 may be disposed in this order in an optical path of pulsed laser light output from the MO 72.

The MO 72 may include a laser chamber 81, a charger 82, a pulse power module (PPM) 83, a rear mirror 88, and an output coupler mirror 89. The PPM 83 may include a switch 87. A pair of discharge electrodes 86A and 86B may be disposed inside the laser chamber 81. Windows 84 and 85 may be disposed in an optical path in the laser chamber 81. The rear mirror 88 and the output coupler mirror 89 may constitute an optical resonator.

The PA 73 may include a laser chamber 91, a charger 92, and a PPM 93. The PPM 93 may include a switch 97. A pair of discharge electrodes 96A and 96B may be disposed inside the laser chamber 91. Windows 94 and 95 may be disposed in an optical path in the laser chamber 91.

The laser chambers 81 and 91 may be charged with an ArF, KrF, XeCl, or XeF laser gas.

The optical pulse stretcher 74 may include a beam splitter 110 and concave mirrors 111, 112, 113, and 114.

The monitor module 75 may include a beam splitter 120 and an optical sensor 121.

3.3.2 Operation

First, the laser controller 71 may output, to the shutter 76, a control signal for closing the shutter 76. The laser controller 71 may receive an emission trigger signal Trl from the controller 8 to cause the pulsed laser light output from the MO 72 to be amplified in the PA 73. The laser controller 71 may correct a timing of the emission trigger signal Trl in accordance with a charging voltage at each of the chargers 82 and 92 and transmit the corrected emission trigger signal Trl to the switch 87 and to the switch 97.

Upon a high voltage being applied across the discharge electrodes 86A and 86B of the MO 72, a discharge may occur across the discharge electrodes 86A and 86B in the laser chamber 81, and the laser gas may be excited. Thus, laser oscillation may occur in the optical resonator constituted by the rear mirror 88 and the output coupler mirror 89, and pulsed laser light may be output through the output coupler mirror 89.

The pulsed laser light output from the MO 72 may enter the PA 73. In the PA 73, in synchronization with the pulsed laser light passing through a space between the discharge electrodes 96A and 96B, a discharge may occur across the discharge electrodes 96A and 96B in the laser chamber 91, and the laser gas may be excited. Thus, the pulsed laser light may be amplified in the PA 73. The pulsed laser light amplified in the PA 73 may be stretched to a predetermined pulse width by the optical pulse stretcher 74.

A portion of the pulsed laser light that has passed through the optical pulse stretcher 74 may be reflected by the beam splitter 120 and enter the optical sensor 121. The optical sensor 121 may measure the pulse energy of the pulsed laser light and transmit the measured data to the laser controller 71.

The laser controller 71 may set the charging voltage at each of the chargers 82 and 92 to bring a difference ΔE between target pulse energy Et and measured pulse energy E closer to 0. Upon the difference ΔE falling within a permissible range, the laser controller 71 may open the shutter 76 to output the pulsed laser light from the laser unit 70.

Et Cetera

FIG. 15 illustrates an embodiment in which the PA 73 and the optical pulse stretcher 74 are disposed, but this embodiment is not a limiting example, and it suffices that at least the MO 72 be disposed. In other words, it is not necessarily required to dispose the optical pulse stretcher 74 and the PA 73.

In addition, FIG. 15 illustrates an example of an excimer laser unit of a double-chamber type as an embodiment of the laser unit 70, but this embodiment is not a limiting example, and an excimer laser unit of a single-chamber type may instead be used, for example. An excimer laser unit of a single-chamber type may, for example, be a XeF, XeCl, KrF, or ArF excimer laser unit. In addition, the laser unit is not limited to an excimer laser unit, and the first and second laser units 11A and 11B may each be constituted by a solid-state laser unit. For example, the first and second laser units 11A and 11B may each be constituted by a solid-state laser unit configured to output ultraviolet pulsed laser light. In this case, the solid-state laser unit may, for example, be a laser unit configured to output third-harmonic light (355 nm) or fourth-harmonic light (266 nm) of a YAG laser.

In a case where a variable range of the target pulse energy Et is large, an attenuator with a variable transmittance may be disposed between the PA 73 and the monitor module 75 in the laser unit 70. Alternatively, the attenuator may be disposed in an optical path of the pulsed laser light output from the laser unit 70, instead of being disposed inside the laser unit 70.

3.4 Variations of Irradiation Head

3.4.1 First Configuration Example of Irradiation Head (Beam Homogenizer)

Figure 16:
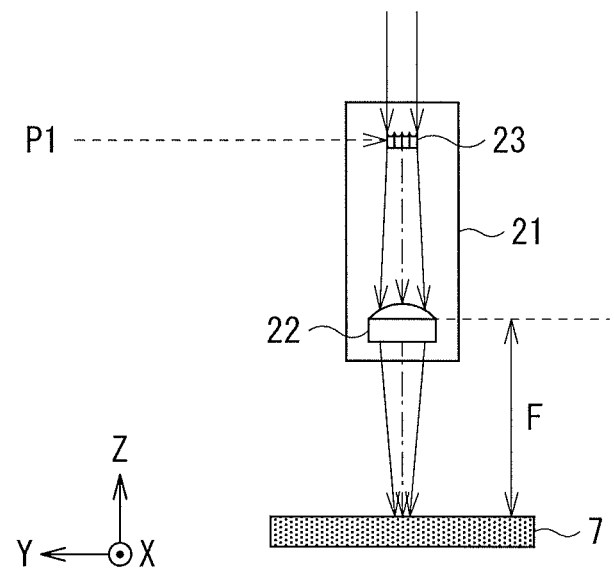
FIG. 16 schematically illustrates a first configuration example of first and second irradiation heads in the laser annealing apparatus according to the first embodiment.
Figure 17:
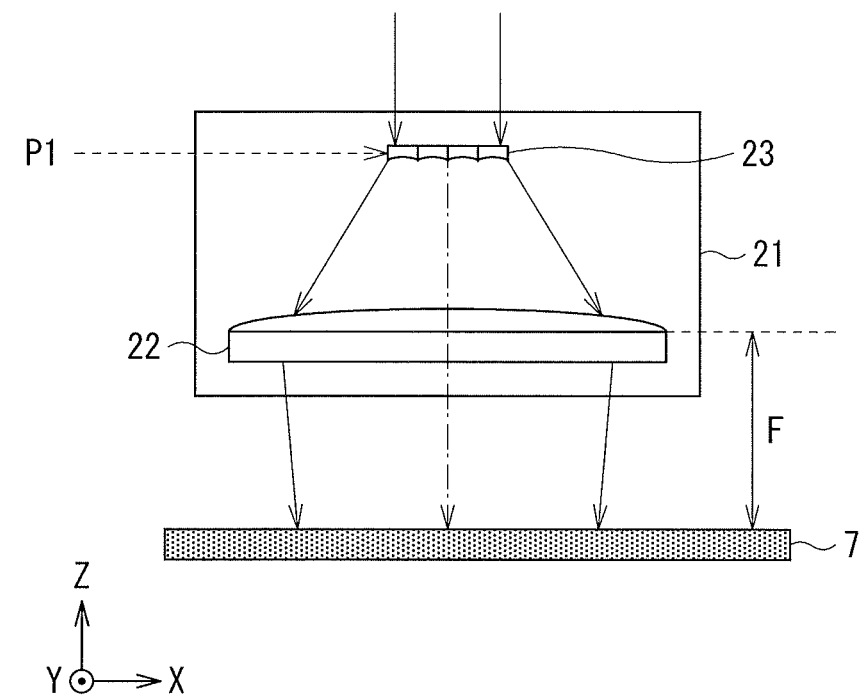
FIG. 17 schematically illustrates a configuration example of the irradiation head illustrated in FIG. 16, as viewed in the Y-axis direction.

FIG. 16 and FIG. 17 schematically illustrate a first configuration example of the first and second irradiation heads 21A and 21B in the laser annealing apparatus 1 illustrated in FIG. 4. FIG. 17 schematically illustrates a configuration example of an irradiation head 21 illustrated in FIG. 16, as viewed in the Y-axis direction.

The first and second irradiation heads 21A and 21B may each be constituted by the irradiation head 21 illustrated in FIG. 16 and FIG. 17.

The irradiation head 21 may be a beam homogenizer and may include a fly-eye lens 23 and a condenser optical system 22.

The fly-eye lens 23 and the condenser optical system 22 may be disposed to provide Kohler illumination. With this configuration, optical intensity may become substantially uniform in a focal plane of the condenser optical system 22.

The condenser optical system 22 may have a focal length of F. In the laser annealing apparatus 1, the controller 8 may control the Z-axis of the XYZ stage 5 to cause the position of the focal plane of the condenser optical system 22 to substantially coincide with the surface of the workpiece 7.

In a case where the first and second irradiation heads 21A and 21B are each constituted by the irradiation head 21, the reference position P1 of the irradiation head 21 may be the position of the fly-eye lens 23.

3.4.2 Second Configuration Example of Irradiation Head (Configuration Example Including Mask and Transfer Lens)

Figure 18:
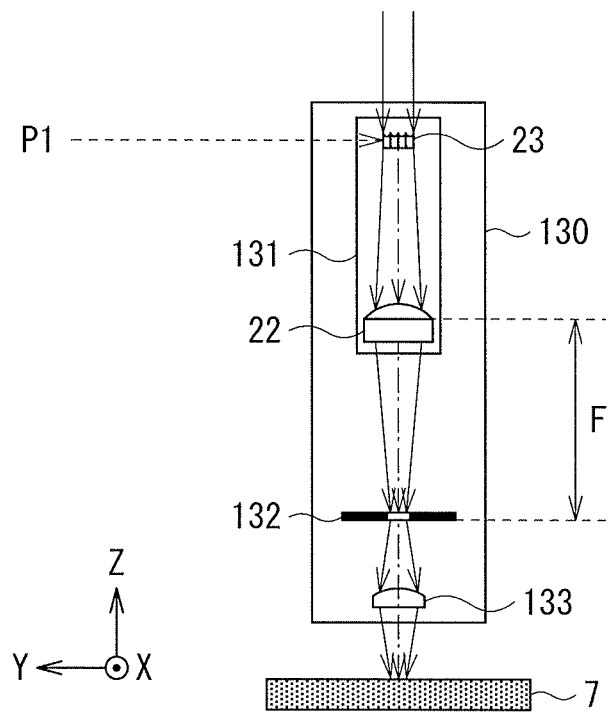
FIG. 18 schematically illustrates a second configuration example of the first and second irradiation heads in the laser annealing apparatus according to the first embodiment.
Figure 19:
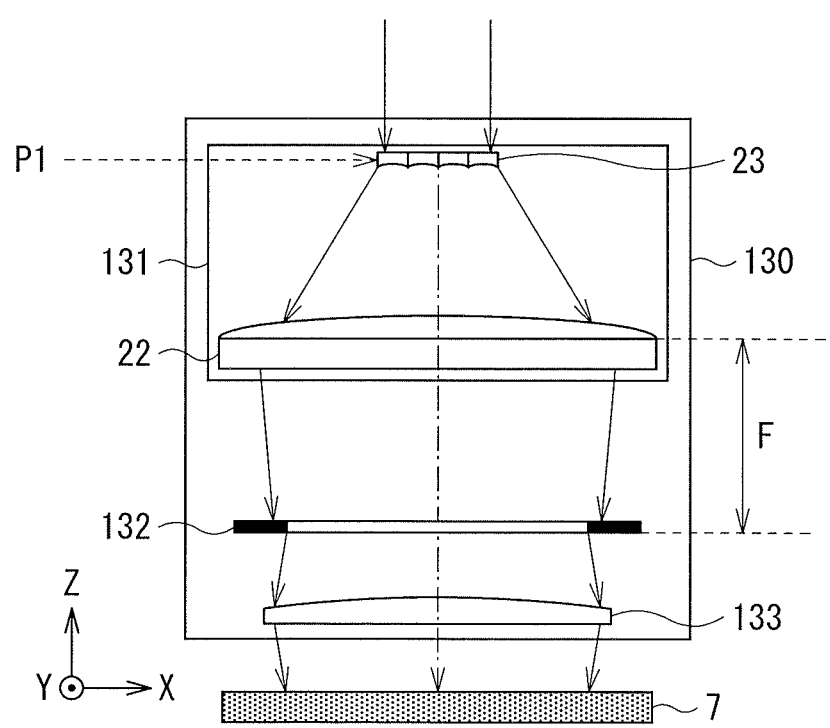
FIG. 19 schematically illustrates a configuration example of the irradiation head illustrated in FIG. 18, as viewed in the Y-axis direction.

FIG. 18 and FIG. 19 schematically illustrate a second configuration example of the first and second irradiation heads 21A and 21B in the laser annealing apparatus 1 illustrated in FIG. 4. FIG. 19 schematically illustrates a configuration example of an irradiation head 130 illustrated in FIG. 18, as viewed in the Y-axis direction.

The first and second irradiation heads 21A and 21B may each be constituted by the irradiation head 130 illustrated in FIG. 18 and FIG. 19.

The irradiation head 130 may include a beam homogenizer 131, a mask 132, and a transfer lens 133.

The beam homogenizer 131 may include the fly-eye lens 23 and the condenser optical system 22 and may be constituted by an optical system substantially the same as the optical system in the irradiation head 21 illustrated in FIG. 16 and FIG. 17.

The mask 132 may be disposed at a position of a focal plane of the condenser optical system 22 in the beam homogenizer 131.

In the irradiation head 130, the mask 132 may be subjected to Kohler illumination by the beam homogenizer 131. Then, an image of the mask 132 may be transferred onto the workpiece 7 by the transfer lens 133. In this case, an edge portion of the intensity distribution of the laser light formed on the workpiece 7 may be steep.

In a case where the first and second irradiation heads 21A and 21B are each constituted by the irradiation head 130, the reference position P1 of the irradiation head 130 may be the position of the fly-eye lens 23.

3.4.3 Third Configuration Example of Irradiation Head (Configuration Example Including Bi-telecentric Optical System)

Figure 20:
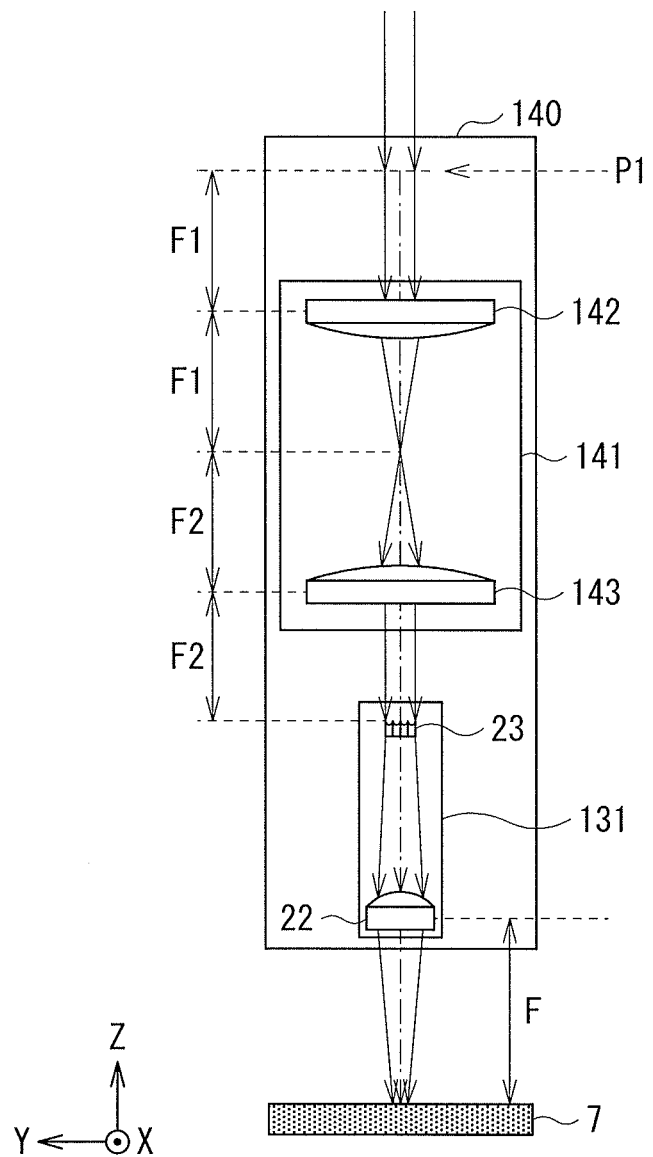
FIG. 20 schematically illustrates a third configuration example of the first and second irradiation heads in the laser annealing apparatus according to the first embodiment.
Figure 21:
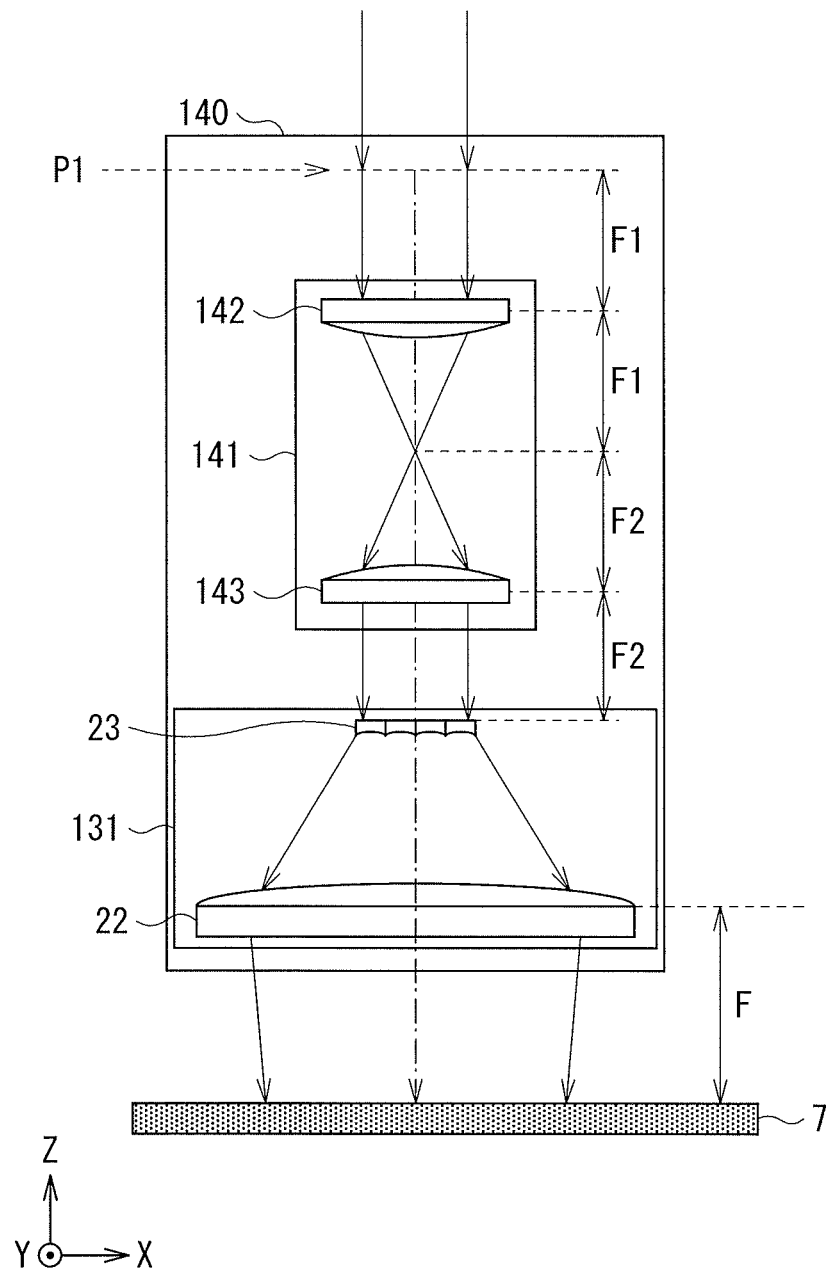
FIG. 21 schematically illustrates a configuration example of the irradiation head illustrated in FIG. 20, as viewed in the Y-axis direction.

FIG. 20 and FIG. 21 schematically illustrate a third configuration example of the first and second irradiation heads 21A and 21B in the laser annealing apparatus 1 illustrated in FIG. 4. FIG. 21 schematically illustrates a configuration example of an irradiation head 140 illustrated in FIG. 20, as viewed in the Y-axis direction.

The first and second irradiation heads 21A and 21B may each be constituted by the irradiation head 140 illustrated in FIG. 20 and FIG. 21.

The irradiation head 140 may include a bi-telecentric optical system 141 and the beam homogenizer 131.

The beam homogenizer 131 may include the fly-eye lens 23 and the condenser optical system 22 and may be constituted by an optical system substantially the same as the optical system in the irradiation head 21 illustrated in FIG. 16 and FIG. 17.

The bi-telecentric optical system 141 may be a conjugate optical system configured to transfer a laser beam onto the fly-eye lens 23. The bi-telecentric optical system 141 may include a condenser optical system 142 having a focal length F1 and a collimator optical system 143 having a focal length F2.

The distance between the condenser optical system 142 and the collimator optical system 143 may be about F1+F2. The condenser optical system 142 and the collimator optical system 143 may be disposed in a manner in which the fly-eye lens 23 is disposed at the position of the posterior focal point of the collimator optical system 143.

In a case where the first and second irradiation heads 21A and 21B are each constituted by the irradiation head 140, the reference position P1 of the irradiation head 140 may be an incident object point position of the bi-telecentric optical system 141. In a case where F1=F2 holds in the irradiation head 140, an image at the reference position P1 may be transferred onto the fly-eye lens 23 with a magnification of 1:1.

3.4.4 Configuration Example of Fly-eye Lens

Figure 22:
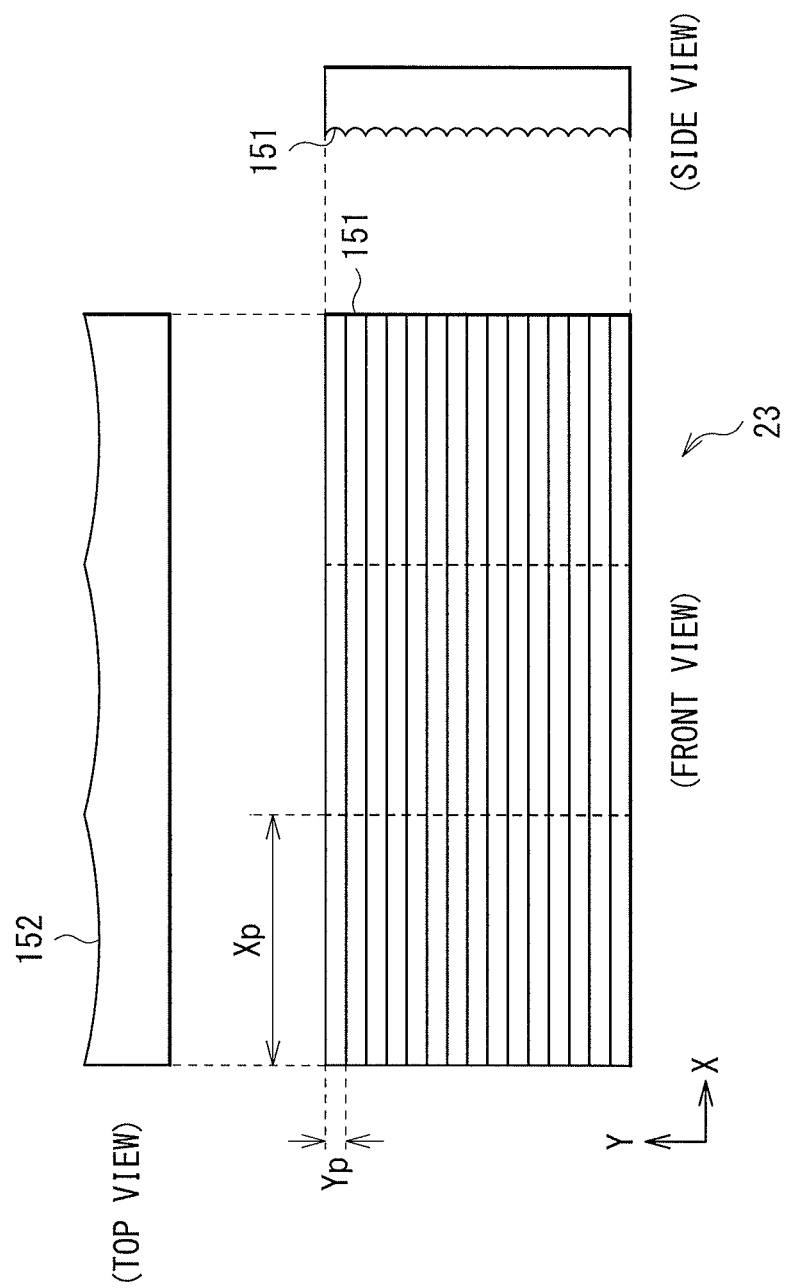
FIG. 22 schematically illustrates a configuration example of a fly-eye lens applied to the first and second irradiation heads.

FIG. 22 schematically illustrates a configuration example of the fly-eye lens 23 applied to the first and second irradiation heads 21A and 21B. FIG. 22 illustrates an embodiment of the fly-eye lens 23 for producing of Kohler illumination of a rectangular line beam. FIG. 22 illustrates a front view, a top view, and a side view of the fly-eye lens 23.

The fly-eye lens 23 may be formed by processing a substrate made of a material that transmits pulsed laser light. Examples of such a material for the substrate may include synthetic quartz and $CaF_2$ crystal.

A front surface of the substrate may be processed to form arrays of concave cylindrical surfaces 151 arranged in the Y-axis direction in a front surface of the fly-eye lens 23.

A back surface of the substrate may be processed to form arrays of concave cylindrical surfaces 152 arranged in the X-axis direction in a back surface of the fly-eye lens 23.

The cylindrical surfaces 151 and 152 may have respective radii of curvature that allow their focal point positions to substantially coincide with each other.

In this example, it is preferable that a pitch Yp of the cylindrical surfaces in the Y-axis direction be smaller than a pitch Xp of the cylindrical surfaces in the X-axis direction.

When pulsed laser light is transmitted through the fly-eye lens 23, a secondary light source may be generated at the positions of the focal points of the cylindrical surfaces 151 and 152. With this configuration, in a case where the fly-eye lens 23 is applied to the first and second irradiation heads 21A and 21B, the first and second condenser optical systems 22A and 22B may form rectangular Kohler illumination at the positions of the focal planes of the first and second condenser optical systems 22A and 22B. The shape of a region to be Kohler-illuminated may be similar to the shape of one lens in the fly-eye lens 23 that is defined by the pitch Yp and the pitch Xp.

Et Cetera

FIG. 22 illustrates an example in which the concave cylindrical surfaces 151 and 152 are formed in a substrate that transmits laser light, but this is not a limiting example, and convex cylindrical surfaces may instead be formed in a substrate. In addition, a substrate may be processed to form a Fresnel lens that serves a substantially identical function as a cylindrical lens.

In addition, FIG. 22 illustrates an embodiment in which a rectangular line beam is formed. Alternatively, a beam of another shape, such as a square beam, may be formed. The beam shape may be varied by adjusting the shape of each lens in the fly-eye lens 23 that is defined by the pitch Yp and the pitch Xp.

4. THIRD EMBODIMENT

A laser annealing apparatus according to a third embodiment of the present disclosure will now be described. In the following, constituent elements that are substantially the same as those of the laser annealing apparatus according to the comparative example or the first embodiment described above or those of the variations of each section according to the second embodiment described above are given identical reference characters, and descriptions thereof will be omitted as appropriate.

4.1 Configuration

Figure 23:
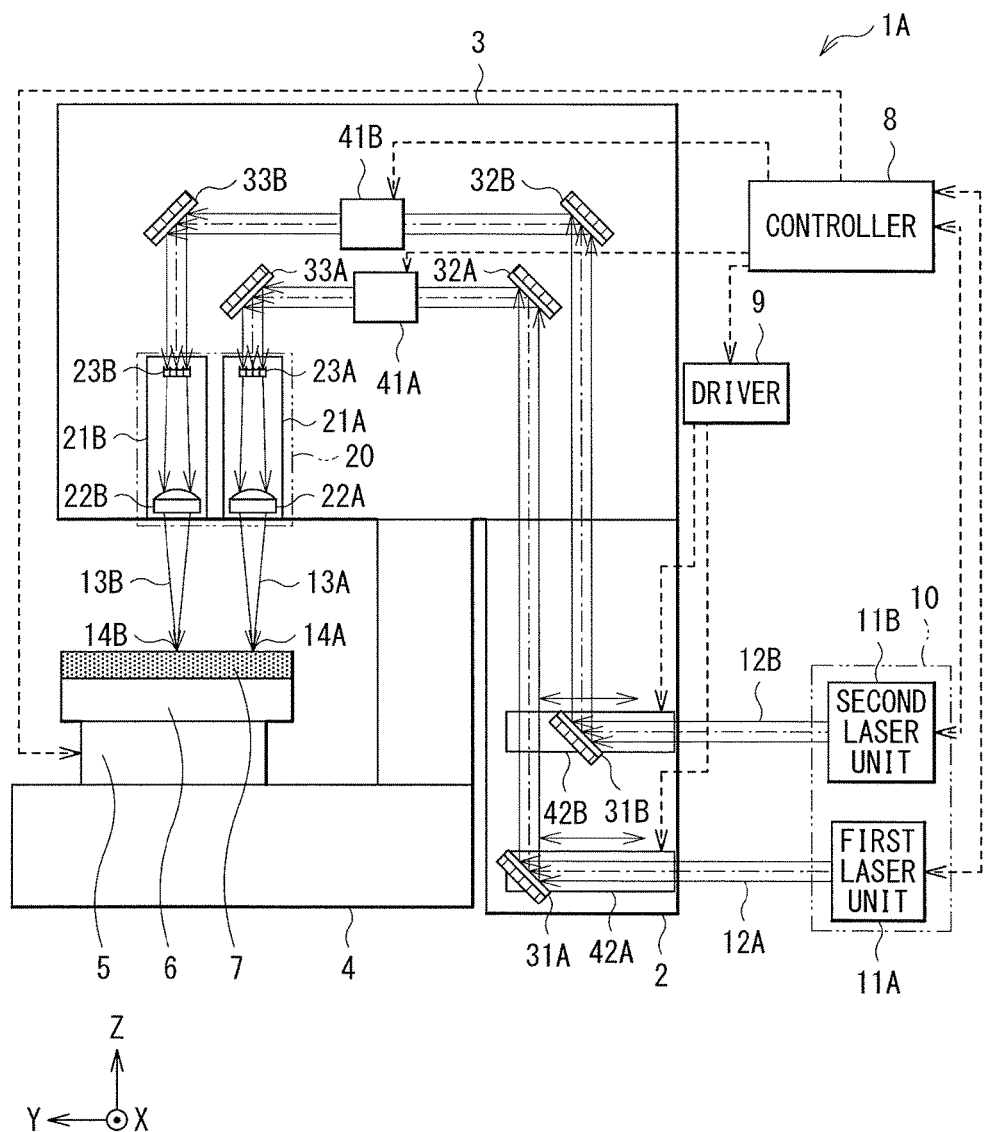
FIG. 23 schematically illustrates a configuration example of a laser annealing apparatus according to a third embodiment.

FIG. 23 schematically illustrates a configuration example of a laser annealing apparatus 1A according to the third embodiment of the present disclosure.

In the first embodiment described above, the first and second beam property varying sections 41A and 41B are disposed in an optical path between the laser unit section 10 and the beam delivery section 2 as a configuration example. The positions where the first and second beam property varying sections 41A and 41B are disposed are not limited thereto.

For example, as in the laser annealing apparatus 1A illustrated in FIG. 23, the first and second beam property varying sections 41A and 41B may be disposed in an optical path between the beam delivery section 2 and the irradiation head section 20.

For example, the first beam property varying section 41A may be disposed in an optical path between the first laser unit 11A and the irradiation head section 20. To be more specific, the first beam property varying section 41A may be disposed in an optical path between the beam delivery section 2 and the first irradiation head 21A. For example, the first beam property varying section 41A may be disposed in an optical path between the second high reflection mirror 32A and the third high reflection mirror 33A in the optical system 3. The first beam property varying section 41A may vary the beam property of one of the first laser light 12A and the second laser light 12B in response to the switching of the optical paths by the beam delivery section 2.

In addition, for example, the second beam property varying section 41B may be disposed in an optical path between the second laser unit 11B and the irradiation head section 20. To be more specific, the second beam property varying section 41B may be disposed in an optical path between the beam delivery section 2 and the second irradiation head 21B. For example, the second beam property varying section 41B may be disposed in an optical path between the second high reflection mirror 32B and the third high reflection mirror 33B in the optical system 3. The second beam property varying section 41B may vary the beam property of one of the first laser light 12A and the second laser light 12B in response to the switching of the optical paths by the beam delivery section 2.

Other configurations may be substantially similar to those of the laser annealing apparatus 1 according to the first embodiment described above.

4.2 Operation

Figure 24:
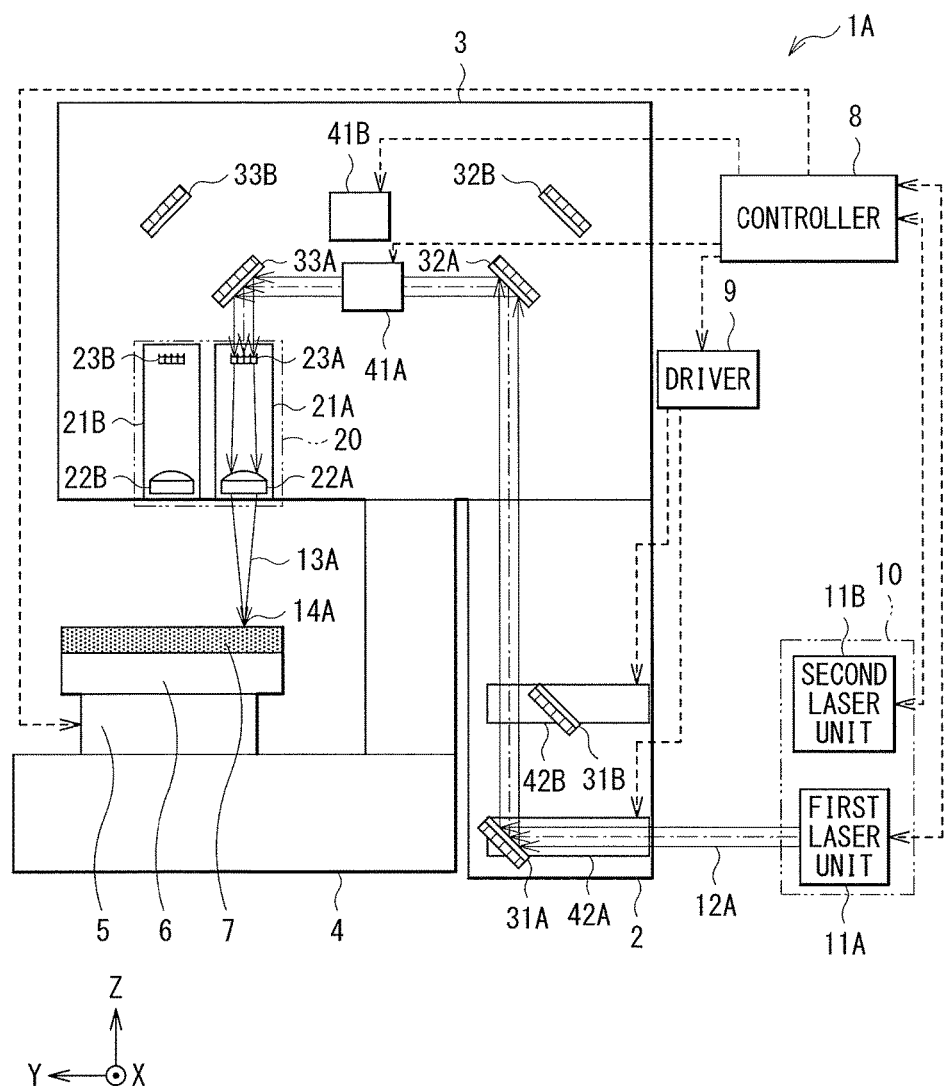
FIG. 24 schematically illustrates a first state in a case where a first laser unit alone is made to oscillate in the laser annealing apparatus according to the third embodiment.

FIG. 24 schematically illustrates a first state in a case where the first laser unit 11A alone is made to oscillate in the laser annealing apparatus 1A. In the state illustrated in FIG. 24, the optical path is set by the beam delivery section 2 to cause the first laser light 12A from the first laser unit 11A to enter the first irradiation head 21A.

Figure 25:
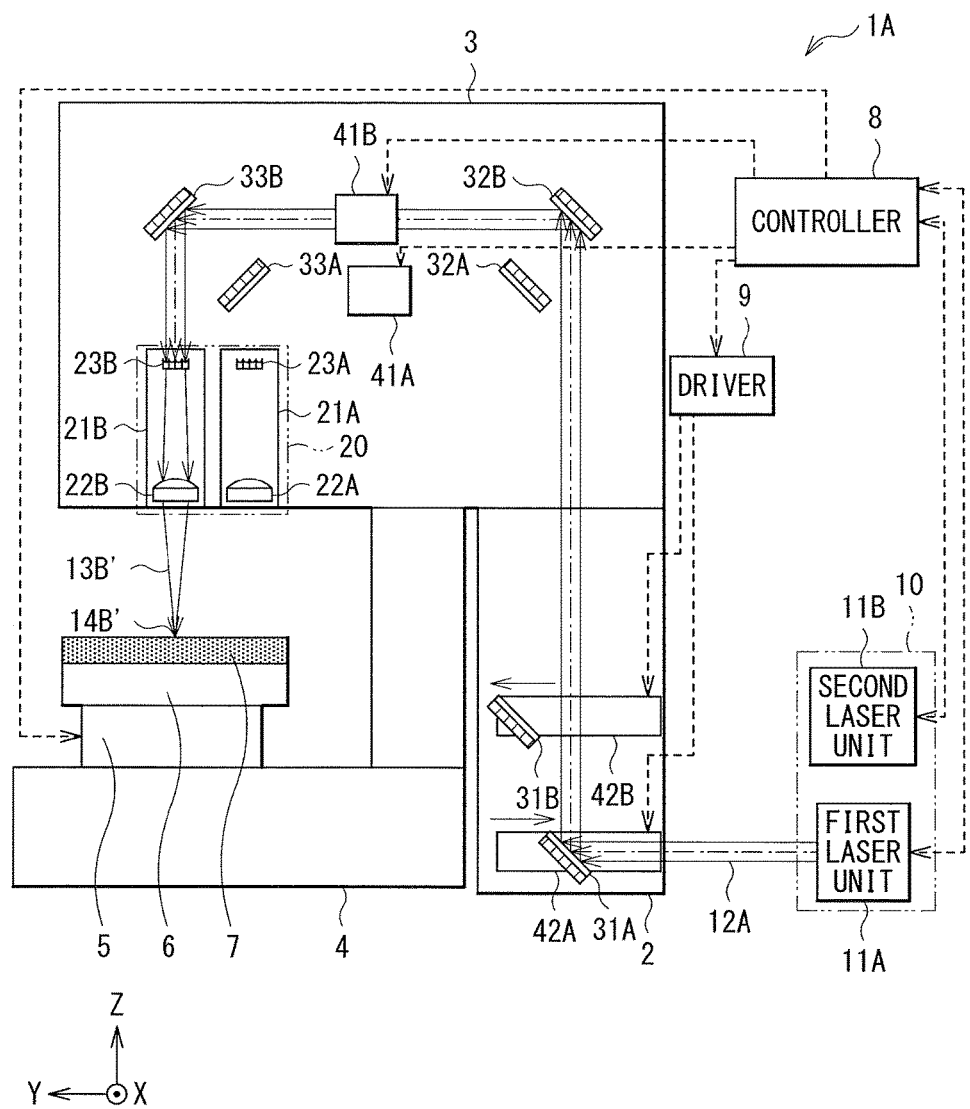
FIG. 25 schematically illustrates a second state in a case where a first laser unit alone is made to oscillate in the laser annealing apparatus according to the third embodiment.

FIG. 25 schematically illustrates a second state in a case where the first laser unit 11A alone is made to oscillate in the laser annealing apparatus 1A. In the state illustrated in FIG. 25, the optical path has been switched from the state illustrated in FIG. 24 by the beam delivery section 2, and the first laser light 12A from the first laser unit 11A enters the second irradiation head 21B.

In a case where the first and second laser units 11A and 11B are both operable, as illustrated in FIG. 23, the controller 8 may control the beam delivery section 2 to cause the first laser light 12A to enter the first irradiation head 21A and to cause the second laser light 12B to enter the second irradiation head 21B.

In addition, in a case where either one of the first and second laser units 11A and 11B is inoperable, the controller 8 may control the beam delivery section 2 to cause the laser light output from an operable one of the first and second laser units 11A and 11B to enter one of the first and second irradiation heads 21A and 21B and then to enter the other one of the first and second irradiation heads 21A and 21B. For example, in a case where the first laser unit 11A is an operable laser unit, the controller 8 may control the beam delivery section 2 to cause the first laser light 12A to enter the first irradiation head 21A, as illustrated in FIG. 24, and then to enter the second irradiation head 21B, as illustrated in FIG. 25.

In addition, in a case where either one of the first and second laser units 11A and 11B comes to be inoperable, the controller 8 may control either one of the first and second beam property varying sections 41A and 41B in response to the switching of the optical paths by the beam delivery section 2 to vary the beam property of the laser light output from an operable one of the first and second laser units 11A and 11B.

For example, in the state illustrated in FIG. 24, the beam property of the first laser light 12A may be varied by the first beam property varying section 41A. In addition, in the state illustrated in FIG. 25, the beam property of the first laser light 12A may be varied by the second beam property varying section 41B.

Other operations and advantageous effects may be substantially similar to those of the laser annealing apparatus 1 according to the first embodiment described above.

5. FOURTH EMBODIMENT

A laser annealing apparatus according to a fourth embodiment of the present disclosure will now be described. In the following, constituent elements that are substantially the same as those of the laser annealing apparatus according to the comparative example or the first or third embodiment described above or those of the variations of each section according to the second embodiment described above are given identical reference characters, and descriptions thereof will be omitted as appropriate.

5.1 Configuration

Figure 26:
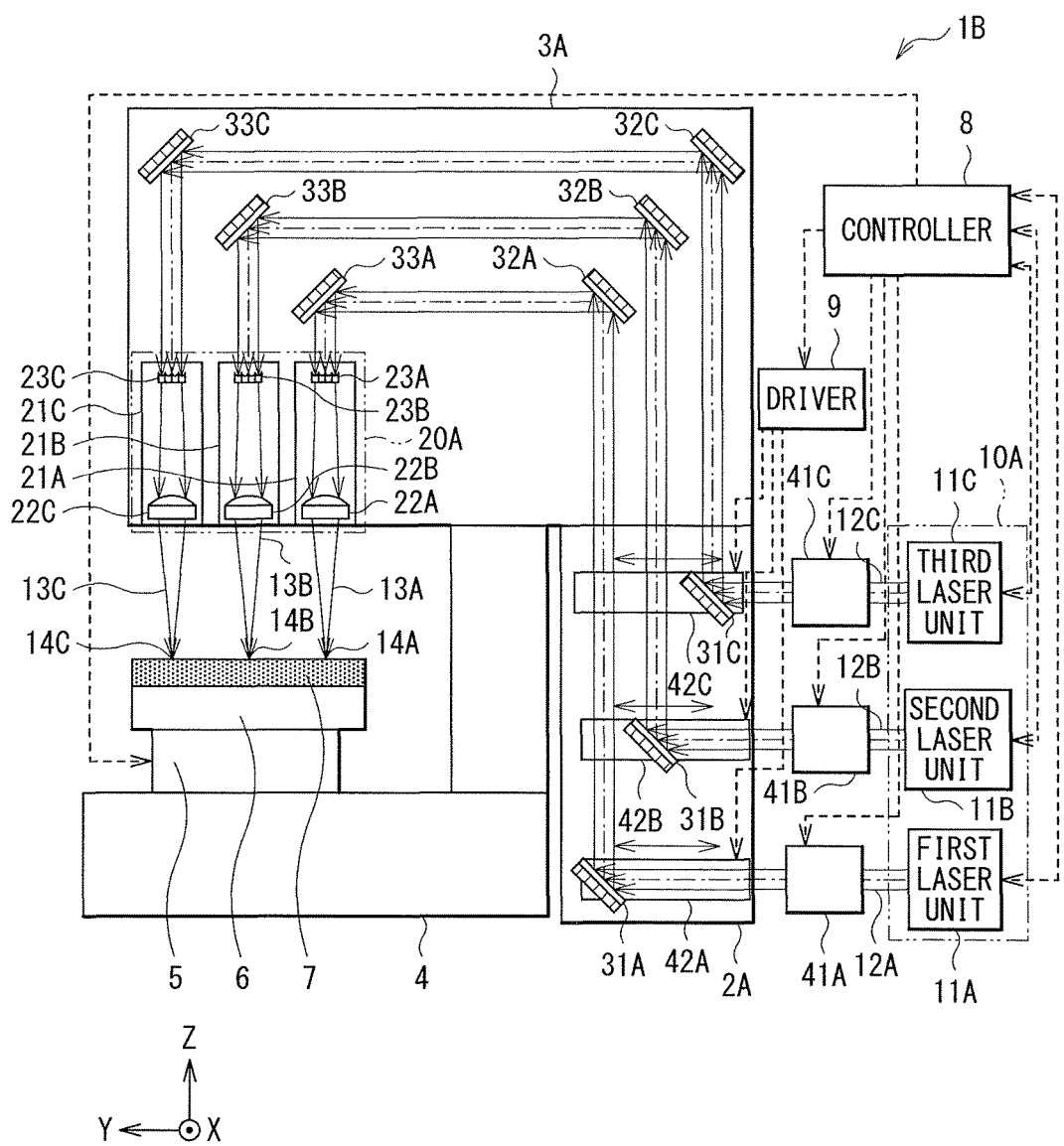
FIG. 26 schematically illustrates a configuration example of a laser annealing apparatus according to a fourth embodiment.

FIG. 26 schematically illustrates a configuration example of a laser annealing apparatus 1B according to the fourth embodiment of the present disclosure.

In each of the embodiments described above, a configuration example in which two laser units and two irradiation heads are provided is illustrated, but this is not a limiting example, and three or more laser units and three or more irradiation heads may be provided.

For example, as in the laser annealing apparatus 1B illustrated in FIG. 26, three laser units and three irradiation heads may be provided.

The laser annealing apparatus 1B may include a laser unit section 10A, a beam delivery section 2A, and an optical system 3A. In addition, the laser annealing apparatus 1B may include a third beam property varying section 41C, in addition to the first and second beam property varying sections 41A and 41B.

The laser unit section 10A may include a third laser unit 11C configured to output third laser light 12C, in addition to the first and second laser units 11A and 11B. The first laser light 12A output from the first laser unit 11A, the second laser light 12B output from the second laser unit 11B, and the third laser light 12C output from the third laser unit 11C may have substantially the same beam property, namely, substantially the same beam size and substantially the same beam divergence angle.

The optical system 3A may include a second high reflection mirror 32C, in addition to the second high reflection mirrors 32A and 32B. The optical system 3A may further include a third high reflection mirror 33C, in addition to the third high reflection mirrors 33A and 33B. In addition, the optical system 3A may include an irradiation head section 20A.

The irradiation head section 20A may include a third irradiation head 21C, in addition to the first and second irradiation heads 21A and 21B. The third irradiation head 21C may include a third condenser optical system 22C and a third fly-eye lens 23C.

The beam delivery section 2A may include a first high reflection mirror 31C, in addition to the first high reflection mirrors 31A and 31B. Further, the beam delivery section 2A may include a third linear stage 42C, in addition to the first and second linear stages 42A and 42B. The first high reflection mirror 31C may be disposed on the third linear stage 42C with a holder interposed therebetween.

The optical paths of the first laser light 12A, the second laser light 12B, and the third laser light 12C may be switchable by moving the positions of the first high reflection mirrors 31A, 31B, and 31C on the first, second, and third linear stages 42A, 42B, and 42C. As the optical paths are switched by the beam delivery section 2A, the first laser light 12A, the second laser light 12B, and the third laser light 12C may selectively be allowed to enter one of the first, second, and third irradiation heads 21A, 21B, and 21C.

The third beam property varying section 41C may be disposed in an optical path between the third laser unit 11C and the irradiation head section 20A. To be more specific, the third beam property varying section 41C may be disposed in an optical path of the third laser light 12C between the third laser unit 11C and the beam delivery section 2A. The third beam property varying section 41C may vary the beam property of the third laser light 12C in response to the switching of the optical paths by the beam delivery section 2A.

The first, second, and third irradiation heads 21A, 21B, and 21C may be configured to substantially the same specifications. The third irradiation head 21C may be disposed to direct a line beam 13C to a third irradiation line 14C on the workpiece 7 for forming of a thin-film transistor.

The third fly-eye lens 23C and the third condenser optical system 22C may allow the line beam 13C, with which the third irradiation line 14C is irradiated, to have a uniform irradiation region.

The first laser unit 11A may output a predetermined signal denoting operation halt to the controller 8 on condition that the first laser unit 11A comes to be inoperable due to a mechanical problem or for maintenance, the second laser unit 11B may output a predetermined signal denoting operation halt to the controller 8 on condition that the second laser unit 11B comes to be inoperable due to a mechanical problem or for maintenance, and the third laser unit 11C may output a predetermined signal denoting operation halt to the controller 8 on condition that the third laser unit 11C comes to be inoperable due to a mechanical problem or for maintenance.

5.2 Operation

In a case where the first, second, and third laser units 11A, 11B, and 11C are all operable, as illustrated in FIG. 26, the controller 8 may control the beam delivery section 2A to cause the first laser light 12A to enter the first irradiation head 21A and to cause the second laser light 12B to enter the second irradiation head 21B. The controller 8 may also control the beam delivery section 2A to cause the third laser light 12C to enter the third irradiation head 21C.

In addition, in a case where one or more of the first, second, and third laser units 11A, 11B, and 11C is/are inoperable, for example, the controller 8 may control the beam delivery section 2A to cause the laser light output from one or more operable laser unit(s) to enter the irradiation head(s) corresponding to the operable laser unit(s) and then to enter the irradiation head(s) corresponding to the inoperable laser unit(s). For example, in a case where the third laser unit 11C is an inoperable laser unit, the controller 8 may first cause the first and second laser units 11A and 11B to oscillate and may control the beam delivery section 2A to cause the first laser light 12A to enter the first irradiation head 21A and to cause the second laser light 12B to enter the second irradiation head 21B. Then, the controller 8 may cause the first laser unit 11A alone to oscillate and may control the beam delivery section 2A to cause the first laser light 12A to enter the third irradiation head 21C corresponding to the inoperable laser unit.

In addition, in a case where one or more laser unit(s) come(s) to be inoperable, the controller 8 may control one or more of the first, second, and third beam property varying sections 41A, 41B, and 41C in response to the switching of the optical paths by the beam delivery section 2A to vary the beam property of the laser light output from the operable laser unit(s).

5.3 Advantageous Effects

With the laser annealing apparatus 1B according to the present embodiment, even in a case where one or more of a plurality of laser units come(s) to be inoperable, laser light from one or more operable laser unit(s) may be introduced into a beam line of the laser unit(s) that is/are not in operation by controlling the beam delivery section 2A. Consequently, the laser light may be made to enter the irradiation head(s) that is/are not in operation, and the workpiece 7 may be irradiated with the laser light.

Other configurations, operations, and advantageous effects may be substantially similar to those of the laser annealing apparatus 1 according to the first embodiment described above.

6. HARDWARE ENVIRONMENT OF CONTROLLER

A person skilled in the art will appreciate that the subject matter described herein may be implemented by a general-purpose computer or a programmable controller in combination with a program module or a software application. In general, a program module includes routines, programs, components, data structures, and so forth that can implement the processes described in some embodiments of the present disclosure.

Figure 27:
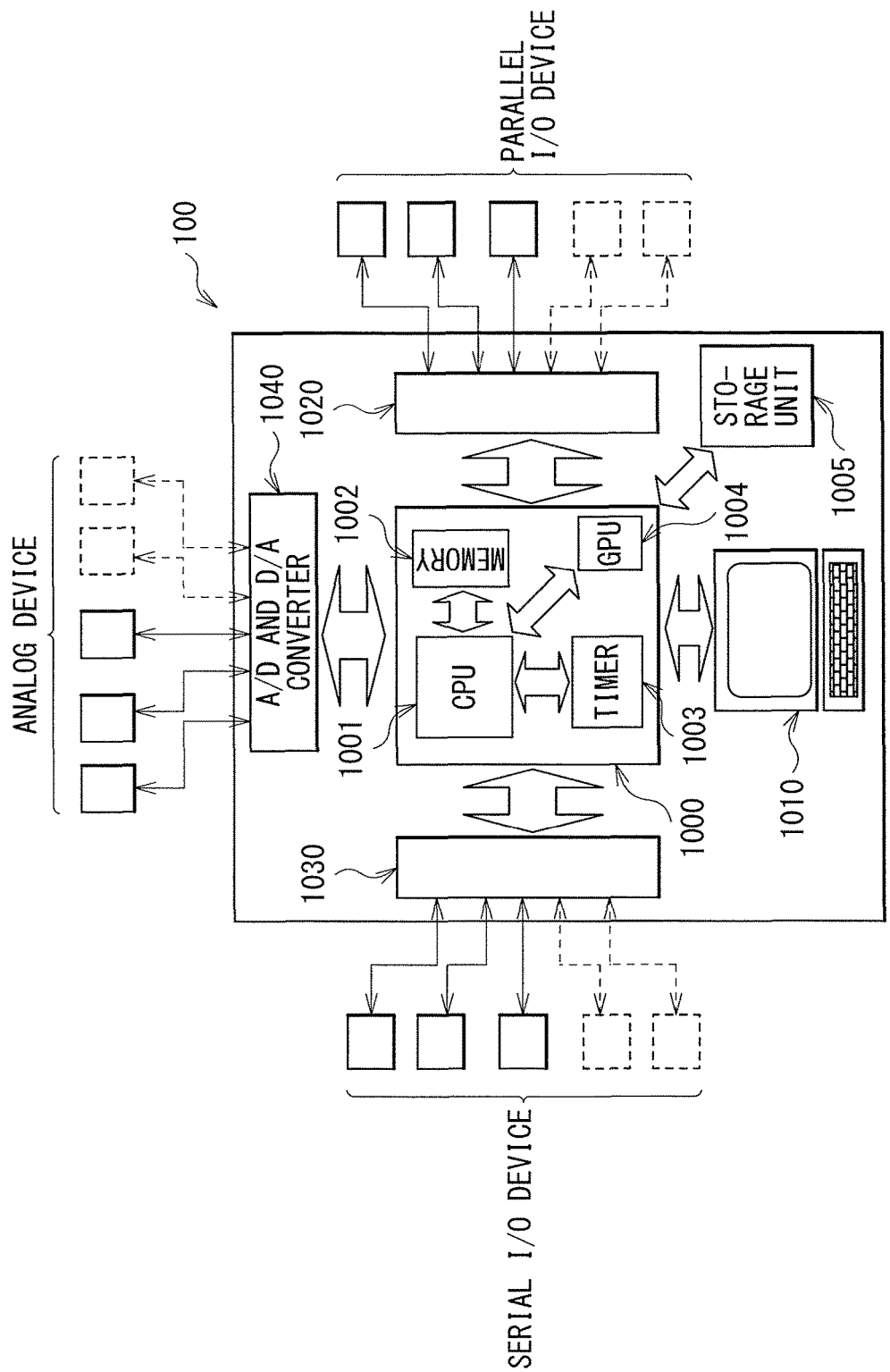
FIG. 27 illustrates an example of a hardware environment of a controller.

FIG. 27 is a block diagram illustrating an exemplary hardware environment in which various aspects of the disclosed subject matter may be implemented. An exemplary hardware environment 100 illustrated in FIG. 27 may include a processing unit 1000, a storage unit 1005, a user interface 1010, a parallel input/output (I/O) controller 1020, a serial I/O controller 1030, and an analog-to-digital (A/D) and digital-to-analog (D/A) converter 1040. The configuration of the hardware environment 100, however, is not limited to the above.

The processing unit 1000 may include a central processing unit (CPU) 1001, a memory 1002, a timer 1003, and a graphics processing unit (GPU) 1004. The memory 1002 may include a random-access memory (RAM) and a read-only memory (ROM). The CPU 1001 may be any of commercially available processors. Dual microprocessors and other multi-processor architectures may also be employed as the CPU 1001.

These components illustrated in FIG. 27 may be interconnected to one another to implement the processes described in some embodiments of the present disclosure.

In operation, the processing unit 1000 may load programs stored in the storage unit 1005 and execute the programs. The processing unit 1000 may also load data from the storage unit 1005 along with the programs. In addition, the processing unit 1000 may write data into the storage unit 1005. The CPU 1001 may execute the programs loaded from the storage unit 1005. The memory 1002 may be a work area for temporarily storing of the programs to be executed by the CPU 1001 and the data to be used in the operations of the CPU 1001. The timer 1003 may measure time intervals to provide the CPU 1001 with a measured result in accordance with the execution of the programs. The GPU 1004 may process image data and provide the CPU 1001 with a processing result in accordance with the programs loaded from the storage unit 1005.

The parallel I/O controller 1020 may be coupled to parallel I/O devices, such as the XYZ stage 5, the controller 8, the laser controller 71, and the shutter 76, that can communicate with the processing unit 1000 and may control communication between the processing unit 1000 and these parallel I/O devices. The serial I/O controller 1030 may be coupled to a plurality of serial I/O devices, such as the controller 8, the laser controller 71, the first, second, and third linear stages 42A, 42B, and 42C, the single-axis stage 56, and the single-axis stage 65, that can communicate with the processing unit 1000 and may control communication between the processing unit 1000 and these serial I/O devices. The A/D and D/A converter 1040 may be coupled to various sensors, such as the optical sensor 121, and analog devices through analog ports, may control communication between the processing unit 1000 and these analog devices, and may perform A/D and D/A conversion of the communication content.

The user interface 1010 may display progress in the programs executed by the processing unit 1000 for an operator so that the operator can instruct the processing unit 1000 to stop execution of the programs or to execute an interruption routine.

The exemplary hardware environment 100 may be applied to configurations such as the controller 8 according to some embodiments of the present disclosure. A person skilled in the art will appreciate that these controllers may be implemented in distributed computing environments, where tasks are implemented by processing units that are linked through a communication network. In some embodiments of the present disclosure, the controller 8 and so forth may be coupled to each other through a communication network such as Ethernet (registered trademark) and the Internet. In a distributed computing environment, program modules may be stored in both local and remote memory storage devices.

7. ET CETERA

The above-described embodiments are non-limiting and are merely illustrative in nature. Therefore, it should be appreciated by a person skilled in the art that modifications may be made to the embodiments of the present disclosure without departing from the scope set forth in the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Further, the singular forms "a", "an", and "the" used in the specification and the appended claims are to be construed as "at least one" or "one or more".

What is claimed is:

1. A laser irradiation apparatus, comprising:
    an irradiation head section including a first irradiation head and a second irradiation head each configured to perform laser light irradiation on a workpiece;
    a laser unit section including a first laser unit configured to output first laser light and a second laser unit configured to output second laser light;
    a beam delivery section provided in an optical path between the laser unit section and the irradiation head section, and configured to perform switching of optical paths between an optical path of the first laser light and an optical path of the second laser light to cause one of the first laser light and the second laser light to enter one of the first irradiation head and the second irradiation head;
    a first beam property varying section provided in an optical path between the first laser unit and the irradiation head section, and configured to vary a beam property of one of the first laser light and the second laser light in response to the switching of the optical paths by the beam delivery section; and
    a second beam property varying section provided in an optical path between the second laser unit and the irradiation head section, and configured to vary a beam property of one of the first laser light and the second laser light in response to the switching of the optical paths by the beam delivery section.

2. The laser irradiation apparatus according to claim 1, wherein the first beam property varying section comprises a first optical path length varying section configured to vary an optical path length of the first laser light to cause a first optical path length to be substantially equal to a second optical path length, the first optical path length being an optical path length between the first laser unit and the first irradiation head upon the switching of the optical paths to cause the first laser light to enter the first irradiation head, the second optical path length being an optical path length between the first laser unit and the second irradiation head upon the switching of the optical paths to cause the first laser light to enter the second irradiation head.

3. The laser irradiation apparatus according to claim 1, wherein the second beam property varying section comprises a second optical path length varying section configured to vary an optical path length of the second laser light to cause a first optical path length to be substantially equal to a second optical path length, the first optical path length being an optical path length between the second laser unit and the second irradiation head upon the switching of the optical paths to cause the second laser light to enter the second irradiation head, the second optical path length being an optical path length between the second laser unit and the first irradiation head upon the switching of the optical paths to cause the second laser light to enter the first irradiation head.

4. The laser irradiation apparatus according to claim 1, wherein the first beam property varying section comprises a first transfer optical system configured to vary the beam property of the first laser light to cause a first beam size and a first beam divergence angle to be respectively substantially equal to a second beam size and a second beam divergence angle, the first beam size and the first beam divergence angle being respectively a beam size and a beam divergence angle of the first laser light upon the switching of the optical paths to cause the first laser light to enter the first irradiation head, the second beam size and the second beam divergence angle being respectively a beam size and a beam divergence angle of the first laser light upon the switching of the optical paths to cause the first laser light to enter the second irradiation head.

5. The laser irradiation apparatus according to claim 1, wherein the second beam property varying section comprises a second transfer optical system configured to vary the beam property of the second laser light to cause a first beam size and a first beam divergence angle to be respectively substantially equal to a second beam size and a second beam divergence angle, the first beam size and the first beam divergence angle being respectively a beam size and a beam divergence angle of the second laser light upon the switching of the optical paths to cause the second laser light to enter the second irradiation head, the second beam size and the second beam divergence angle being respectively a beam size and a beam divergence angle of the second laser light upon the switching of the optical paths to cause the second laser light to enter the first irradiation head.

6. The laser irradiation apparatus according to claim 1, further comprising a controller configured to control the beam delivery section to perform the switching of the optical paths on condition that one of the first laser unit and the second laser unit comes to be inoperable.

7. The laser irradiation apparatus according to claim 6, wherein
    the controller controls the beam delivery section to cause, on condition that the first laser unit and the second laser unit are both operable, the first laser light to enter the first irradiation head and the second laser light to enter the second irradiation head, and
    the controller controls the beam delivery section to cause, on condition that one of the first laser unit and the second laser unit is inoperable, one of the first laser light output from the operable first laser unit and the second laser light output from the operable second laser unit to enter one of the first irradiation head and the second irradiation head and then enter the other of the first irradiation head and the second irradiation head.

8. The laser irradiation apparatus according to claim 7, wherein the controller controls, on the condition that one of the first laser unit and the second laser unit comes to be inoperable and in response to the switching of the optical paths, one of the first beam property varying section and the second beam property varying section to vary the beam property of one of the first laser light output from the operable first laser unit and the second laser light output from the operable second laser unit.

9. The laser irradiation apparatus according to claim 6, wherein, on the condition that one of the first laser unit and the second laser unit comes to be inoperable, the inoperable one outputs, to the controller, a predetermined signal denoting operation halt.

* * * * *